United States Patent
Kitamura

(10) Patent No.: US 10,823,750 B2
(45) Date of Patent: Nov. 3, 2020

(54) WIND SPEED MEASURING DEVICE AND AIRFLOW MEASURING DEVICE

(71) Applicant: Murata Manufacturing Co., Ltd., Nagaokakyo (JP)

(72) Inventor: Akihiro Kitamura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 122 days.

(21) Appl. No.: 16/288,138

(22) Filed: Feb. 28, 2019

(65) Prior Publication Data

US 2019/0195908 A1    Jun. 27, 2019

Related U.S. Application Data

(63) Continuation of application No. PCT/JP2017/032010, filed on Sep. 5, 2017, which is a continuation of application No. PCT/JP2017/010050, filed on Mar. 13, 2017.

(30) Foreign Application Priority Data

Sep. 8, 2016   (JP) .................. 2016-175575
Dec. 15, 2016  (JP) .................. 2016-243858

(51) Int. Cl.
  *G01P 5/12*    (2006.01)
  *G01F 1/69*    (2006.01)
  (Continued)

(52) U.S. Cl.
  CPC ............ *G01P 5/12* (2013.01); *G01F 1/699* (2013.01); *G01F 1/6986* (2013.01); *G01W 1/00* (2013.01)

(58) Field of Classification Search
  None
  See application file for complete search history.

(56) References Cited

U.S. PATENT DOCUMENTS 5,244,536 A * 9/1993 Tani ................. G01F 1/692
                                         204/192.32
6,035,726 A    3/2000 Bernard et al.
(Continued)

FOREIGN PATENT DOCUMENTS

JP      59-34325 A     2/1984
JP     05-141677 A     6/1993
(Continued)

OTHER PUBLICATIONS

Official Communication issued in International Patent Application No. PCT/JP2017/010050, dated Jun. 13, 2017.
(Continued)

*Primary Examiner* — Harshad R Patel
(74) *Attorney, Agent, or Firm* — Keating & Bennett, LLP

(57) ABSTRACT

A wind speed measuring device includes a constant temperature heat generating device that generates heat at a predetermined set temperature. The constant temperature heat generating device includes a power source, a heat generating element, a switching element, a comparator element, a first negative characteristic thermistor element, and a plurality of resistance elements. The heat generating element and the first negative characteristic thermistor element define a wind speed sensor. The switching element repeats turning on and off to make the heat generating element generate heat at a predetermined set temperature. A pulse voltage is applied from the power source to the heat generating element. A wind speed of a wind contacted with the wind speed sensor is calculated based on a wave form of the applied pulse voltage.

20 Claims, 13 Drawing Sheets

(51) Int. Cl.
    *G01W 1/00*     (2006.01)
    *G01F 1/699*     (2006.01)
    *G01F 1/698*     (2006.01)

(56) References Cited

U.S. PATENT DOCUMENTS

| | | |
|---|---|---|
| 2002/0043104 A1 | 4/2002 | Lammerink |
| 2003/0154781 A1 | 8/2003 | Matsumura |
| 2006/0100795 A1 | 5/2006 | Hagan et al. |
| 2013/0125643 A1 | 5/2013 | Batty et al. |

FOREIGN PATENT DOCUMENTS

| | | |
|---|---|---|
| JP | 06-082286 A | 3/1994 |
| JP | 10-333125 A | 12/1998 |
| JP | 11-326003 A | 11/1999 |
| JP | 2003-240620 A | 8/2003 |
| JP | 2008-014729 A | 1/2008 |
| JP | 2008-241318 A | 10/2008 |
| JP | 2009-153975 A | 7/2009 |
| JP | 2012-052808 A | 3/2012 |

OTHER PUBLICATIONS

Official Communication issued in International Patent Application No. PCT/JP2017/032010, dated Dec. 5, 2017.

\* cited by examiner (NO WIND)

(WEAK WIND)

(INTERMEDIATE WIND)

(STRONG WIND)

WIND SPEED MEASURING DEVICE AND AIRFLOW MEASURING DEVICE

CROSS REFERENCE TO RELATED APPLICATIONS

This application claims the benefit of priority to Japanese Patent Application No. 2016-175575 filed on Sep. 8, 2016, Japanese Patent Application No. 2016-243858 filed on Dec. 15, 2016, and PCT Application No. PCT/JP2017/010050 filed on Mar. 13, 2017, and is a Continuation Application of PCT Application No. PCT/JP2017/032010 filed on Sep. 5, 2017. The entire contents of each of these applications are hereby incorporated herein by reference.

BACKGROUND OF THE INVENTION

1. Field of the Invention

The present invention relates to a wind speed measuring device, in particular relates to a wind speed measuring device with high measurement accuracy that has a simple configuration manufactured at a low cost.

Further, the present invention relates to an airflow measuring device using the wind speed measuring device according to the present invention described above.

2. Description of the Related Art

A wind speed measuring device arranged in a duct or the like so as to measure a wind speed of passing gas is disclosed in Japanese Patent Application Laid-Open No. 2008-241318. FIG. 13 shows a gas flow meter 1000 disclosed in Japanese Patent Application Laid-Open No. 2008-241318. Here, the gas flow meter 1000 disclosed in Japanese Patent Application Laid-Open No. 2008-241318 does not measure "a wind speed" but "an airflow (gas flow)", however as described in Japanese Patent Application Laid-Open No. 2008-241318, "an airflow" and "a wind speed" is able to be extremely easily converted to each other.

The gas flow meter 1000 includes a sensor body 101 and a controller 102.

The sensor body 101 is defined by a printed board 103 on which a thermocouple 104 and a thermistor element (thermistor) 105 are formed.

The thermocouple 104 is defined by a heating wire 106, and copper foils 107a and 107b connected to both sides of the heating wire 106. The heating wire 106 generates thermal electromotive force between heating wire 106 and the copper. For example, the heating wire 106 is formed of constant an which is a kind of Cu—Ni alloy. In the thermocouple 104, the heating wire 106 is energized, the thermal electromotive force is generated between connection points 108a and 108b of the heating wire 106 and the copper foils 107a and 107b.

The controller 102 includes an energizing control circuit 109 for controlling the energization to the heating wire 106, a thermal electromotive force detection circuit 110 for detecting the thermal electromotive force between the connection points 108a and 108b, a temperature measuring circuit 111 to which an output of the thermistor element 105 is input, an A/D (analogue/digital) converter 112 for converting an analogue signal from the thermal electromotive force detection circuit 110 or the temperature measuring circuit 111 into a digital signal, a control circuit 113 for controlling each component described above, and the like.

In a case of a gentle wind, the gas flow meter 1000 detects the thermal electromotive force in accordance with a temperature difference $\Delta T$ between the connection points 108a and 108b by using the thermal electromotive force detection circuit 110 and calculates the gas flow based on the magnitude of the thermal electromotive force.

However, in a case of a strong wind, the gas flow meter 1000 is difficult to measure the gas flow by using the thermocouple 104 because the heating wire 106 is exposed to the strong wind and cooled. Thus, in a case of a strong wind, the gas flow meter 1000 detects a board temperature T of the printed board 103 by using the thermistor element 105, and calculates the gas flow based on the detected result.

The gas flow meter 1000 described above measures the thermal electromotive force generated between the connection points 108a and 108b, or the board temperature T of the printed board 103 detected by the thermistor element 105, based on the magnitude of voltage. Thus, the gas flow meter 1000 is apt to be affected by an influence of a noise, and therefore measurement accuracy of the gas flow might be low. Further, in the gas flow meter 1000, the thermal electromotive force detection circuit 110 and the temperature measuring circuit 111 are required to be calibrated regularly at high accuracy, and therefore a load of maintenance might be large. Further, in a case in which the calibration of the thermal electromotive force detection circuit 110 or the temperature measuring circuit 111 is omitted or the calibration is not correct, the gas flow meter 1000 might not measure the gas flow accurately.

Further, the gas flow meter 1000 cannot be manufactured easily because of its complicated configuration. Further, the gas flow meter 1000 cannot be manufactured at a low cost because a costly component such as the A/D converter 112 and the like is necessary.

SUMMARY OF THE INVENTION

Preferred embodiments of the present invention provide wind speed measuring devices which each include a constant temperature heat generating device that generates heat at a predetermined set temperature or around the predetermined set temperature. The constant temperature heat generating device includes an electricity input portion, a heat generating element, a switching element, a voltage comparing portion, a first negative characteristic thermistor element, and a plurality of resistance elements. The heat generating element and the first negative characteristic thermistor element define a wind speed sensor. The heat generating element generates heat with electricity supplied from the electricity input portion. The switching element is between the electricity input portion and the heat generating element. The voltage comparing portion controls turning on and off of the switching element. The first negative characteristic thermistor element is thermally coupled to the heat generating element so as to be close to the heat generating element in temperature, and the first negative characteristic thermistor element has a resistance value at the predetermined set temperature as a threshold resistance value. The first negative characteristic thermistor element and at least one resistance element are connected in series to define a temperature detection voltage dividing circuit. A temperature detection voltage is output from a connection point between first negative characteristic thermistor element and the resistance element of the temperature detection voltage dividing circuit. At least two resistance elements are connected in series to define a comparison voltage dividing circuit. A comparison voltage is output from a connection point between one resistance element and another resistance element of the comparison voltage dividing circuit. Each of: (a) resistance values of the resistance element of the temperature detection dividing circuit and the resistance elements of the comparison voltage dividing element, and (b) the voltages applied to the temperature detection voltage dividing circuit and the comparison voltage dividing circuit are set such that the temperature detection voltage is equal or substantially equal to the comparison voltage when a temperature of the first negative characteristic thermistor element is equal or substantially equal to the set temperature and a resistance value of the first negative characteristic thermistor element is equal or substantially equal to the threshold resistance value. The voltage comparing portion compares the temperature detection voltage and the comparison voltage, and when the temperature of the first negative characteristic thermistor element is less than the predetermined set temperature and the resistance value of the first negative characteristic thermistor element is larger than the threshold resistance value, the voltage comparing portion turns on the switching element, and when the temperature of the first negative characteristic thermistor element is more than the predetermined set temperature and the resistance value of the first negative characteristic thermistor element is smaller than the threshold resistance value, the voltage comparing portion turns off the switching element. The switching element repeats the turning on and off to apply a pulse voltage from electricity input portion to the heat generating element. A wind speed of a wind contacted with the wind speed sensor is calculated based on a wave form of the applied pulse voltage.

For example, when the temperature of the first negative characteristic thermistor element is less than the predetermined set temperature and the resistance value of the first negative characteristic thermistor element is larger than the threshold resistance value, the temperature detection voltage is larger than the comparison voltage, and when the temperature of the first negative characteristic thermistor element is more than the predetermined set temperature and the resistance value of the first negative characteristic thermistor element is smaller than the threshold resistance value, the temperature detection voltage is smaller than the comparison voltage. Or alternatively, when the temperature of the first negative characteristic thermistor element is less than the set temperature and the resistance value of the first negative characteristic thermistor element is larger than the threshold resistance value, the temperature detection voltage is smaller than the comparison voltage, and when the temperature of the first negative characteristic thermistor element is more than the predetermined set temperature and the resistance value of the first negative characteristic thermistor element is smaller than the threshold resistance value, the temperature detection voltage is larger than the comparison voltage.

A wind speed measuring device according to a preferred embodiment of the present invention includes the constant temperature heat generating device. The constant heat generating device includes the switching element and the heat generating element. The switching element is between the power source and the heat generating element. The switching element is controlled to repeat the turning on and off by the temperature detection voltage dividing circuit, the comparison voltage dividing circuit, the comparator element and the like such that the heat generating element generates heat at the predetermined set temperature or around the set temperature. That is, the switching element is controlled to be on when the temperature of the heat generating element becomes less than the predetermined set temperature and to be off when the temperature of the heat generating element becomes more than the set temperature.

As a result, the pulse voltage is applied from the power source to the heat generating element. And then, the wave form of the pulse voltage changes definitively in accordance with the wind speed of the wind contacted with the wind speed sensor defined by the heat generating element and the first negative characteristic thermistor element. That is, as the wind speed is increased from a no wind, to a weak wind, an intermediate wind, and a strong wind, the duty ratio of the wave form of the pulse voltage is increased. Further, as the wind speed is increased from the no wind, to the weak wind, the intermediate wind, and the strong wind, a ratio of an on-time per one time cycle in the wave form of the pulse voltage is increased.

A wind speed measuring device according to a preferred embodiment of the present invention calculates the wind speed of the wind contacted with the wind speed sensor based on the wave form of the pulse voltage applied from the power source to the heat generating element. For example, the wind speed of the wind contacted with the wind speed sensor may be calculated based on the duty ratio of the wave form of the pulse voltage. Or alternatively, the wind speed of the wind contacted with the wind speed sensor may be calculated based on a length of the ratio of the on-time per one time cycle in the wave form of the pulse voltage.

The voltage comparing portion may include, for example, at least one of a comparator element, an operation amplifier element, and a microcomputer. Further, the switching element may include, for example, a transistor. Further, in a case in which the transistor is used, a field effect transistor may be used. Further, the heat generating element may be a positive characteristic thermistor element. In this case, even if the temperature is increased beyond the set temperature due to an operational failure, a resistance value of the positive characteristic thermistor element is increased, so that the further temperature increase is able to be reduced or prevented. Consequently, high safety is able to be obtained.

It is preferable that the wind speed measuring device further includes a second negative characteristic thermistor element that provides temperature compensation and the set temperature is corrected by the second negative characteristic thermistor element. In this case, the wind speed is able to be measured more accurately. That is, an error might be generated in the duty ratio of the wave form of the pulse voltage due to an influence of the temperature of the wind whose wind speed is to be measured. For example, in a case in which the wind speed measuring device is designed such that the temperature of the wind is set to (assumed as) about 25° C. as a normal temperature, the duty ratio becomes smaller due to the influence of the temperature of the wind when the temperature of the wind is more than about 25° C. On the other hand, when the temperature of the wind is less than about 25° C., the duty ratio becomes larger due to the influence of the temperature of the wind. That is, when the temperature of the wind is more than about 25° C., the first negative characteristic thermistor element to which the electricity is applied reaches the set temperature at a time shorter than the time corresponding to an actual wind speed due to the influence in which the first negative characteristic thermistor element is heated by the temperature of the wind, and the temperature is not decreased abruptly after the supply of the electricity is stopped, so that the duty ratio becomes smaller. Further, when the temperature of the wind is less than about 25° C., the first negative characteristic thermistor element to which the electricity is applied reaches the set temperature at a time longer than the time corresponding to the actual wind speed due to the influence in which the first negative characteristic thermistor element is cooled by the temperature of the wind, and the temperature is decreased abruptly after the supply of the electricity is stopped, so that the duty ratio becomes larger. As described above, by adding the second negative characteristic thermistor element that performs temperature compensation and by correcting the set temperature by using the second negative characteristic thermistor element, the wind speed is able to be measured more accurately.

The correction of the set temperature may be performed such that the set temperature is larger than a temperature of the second negative characteristic thermistor element and different from the temperature of the second negative characteristic thermistor element by a predetermined temperature difference, and the set temperature is changed while keeping the temperature difference in accordance with a temperature change of the second negative characteristic thermistor element. In this case, the temperature of the wind whose wind speed is to be measured is corrected, so that the wind speed is able to be measured further accurately.

It is preferable that the second negative characteristic thermistor element is connected to one resistance element, which defines the comparison voltage dividing circuit, in parallel, and the comparison voltage is corrected by the second negative characteristic thermistor element. In this case, the error of the duty ratio of the wave form of the pulse voltage due to the temperature of the wind is able to be corrected easily. Further, it is preferable that a condenser is further connected to the second negative characteristic thermistor element in parallel. In this case, a noise resistance is able to be improved.

It is preferable that a resistance element is further connected to the first negative characteristic thermistor element in series in the temperature detection voltage dividing circuit. In this case, by adjusting the resistance value of the resistance element to be connected, the temperature detection voltage at the set temperature is able to be set to a required value easily.

Further, as another method of correcting the influence of the temperature of the wind whose wind speed is to be measured in accordance with preferred embodiments of the present invention, it is also preferable that one resistance element of the comparison voltage dividing circuit is replaced by a second negative characteristic thermistor element that provides temperature compensation, a resistance value of another resistance element of the comparison voltage dividing circuit and a resistance value of the resistance element of the temperature detection voltage dividing circuit are adjusted, and the set temperature is corrected by the second negative characteristic thermistor element. Further, in this case, it is further preferable that the set temperature is larger than a temperature of the second negative characteristic thermistor element and different from the temperature of the second negative characteristic thermistor element by a predetermined temperature difference, and the set temperature is changed while keeping the temperature difference in accordance with a temperature change of the second negative characteristic thermistor element. In these cases, the influence of the temperature of the wind whose wind speed is to be measured is corrected without increasing the number of components, and the wind speed is able to be measured more accurately.

It is also preferable that a second negative characteristic thermistor element that provides temperature compensation is connected to one resistance element of the comparison voltage dividing circuit in series, the set temperature is corrected by the second negative characteristic thermistor element, the set temperature is more than a temperature of the second negative characteristic thermistor, the set temperature is changed in accordance with a temperature change of the second negative characteristic thermistor element, a temperature difference between the set temperature and the temperature of the second negative characteristic thermistor element becomes smaller as the temperature of the second negative characteristic thermistor element is increased, and the temperature difference between the set temperature and the temperature of the second negative characteristic thermistor element becomes larger as the temperature of the second negative characteristic thermistor element is decreased. For example, in a case in which a positive characteristic thermistor element is adopted in the heat generating element, since the resistance value of the positive characteristic thermistor element is increased and the positive characteristic thermistor element hardly generates heat as the temperature thereof is increased, the on-time of the pulse voltage might be longer more than that corresponding to the actual wind speed. However, by setting a relationship between the set temperature and the temperature of the second negative characteristic thermistor element as described above, in a case in which the temperature of the second negative characteristic thermistor element is increased, the set temperature is corrected to be low and the on-time of the pulse voltage is corrected to be short, so that the measurement error is able to be corrected.

It is preferable that an electrical characteristic of the first negative characteristic thermistor element is the same as or substantially the same as an electrical characteristic of the second negative characteristic thermistor element.

Further, the wind speed measuring devices according to preferred embodiments of the present invention are able to be used as it is as an airflow measuring device.

The wind speed measuring devices of preferred embodiments of the present invention barely receive the influence of the noise and therefore the high measurement accuracy is able to be obtained. Further, the wind speed measuring devices of preferred embodiments of the present invention are able to be manufactured easily because of their simple configuration. Further, the wind speed measuring devices of preferred embodiments of the present invention are able to be manufactured at a low cost because a costly A/D converter is not necessary.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Figure 1:
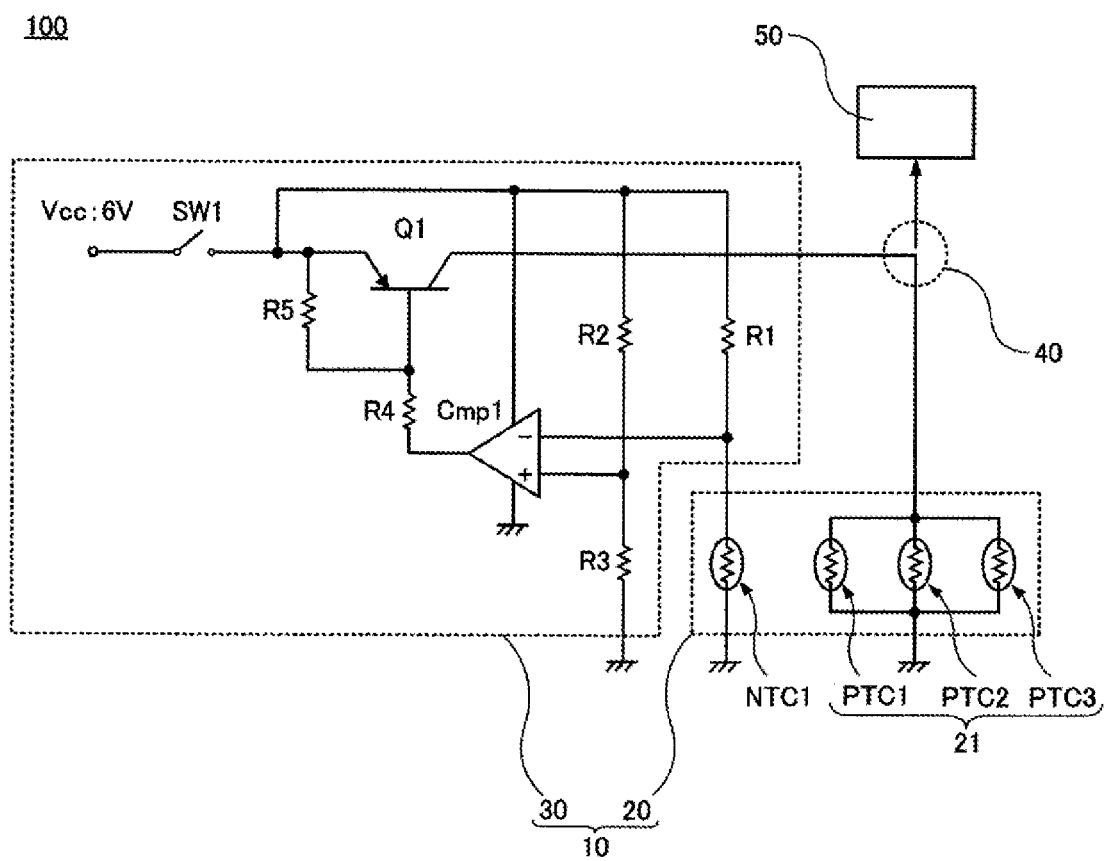
FIG. 1 is an equivalent circuit illustrating a wind speed measuring device 100 according to a first preferred embodiment of the present invention.

Here, each preferred embodiment exemplary describes the present invention, and therefore the present invention is not limited to each preferred embodiment. Further, the present invention is able to be carried out by combining configurations described in different preferred embodiments, and in such a case, the combined preferred embodiment is also included by the present invention. Further, the drawings are provided to aid in understanding the description, and therefore the drawings may be schematically illustrated and a ratio of a dimension of a component or a ratio of dimensions between the components may not be matched with the ratio of the dimensions described in the description. Further, the components described in the description may not be illustrated in the drawings, or the number of the components in the drawings may not be matched with the number of the components described in the description.

First Preferred Embodiment

Figure 2:
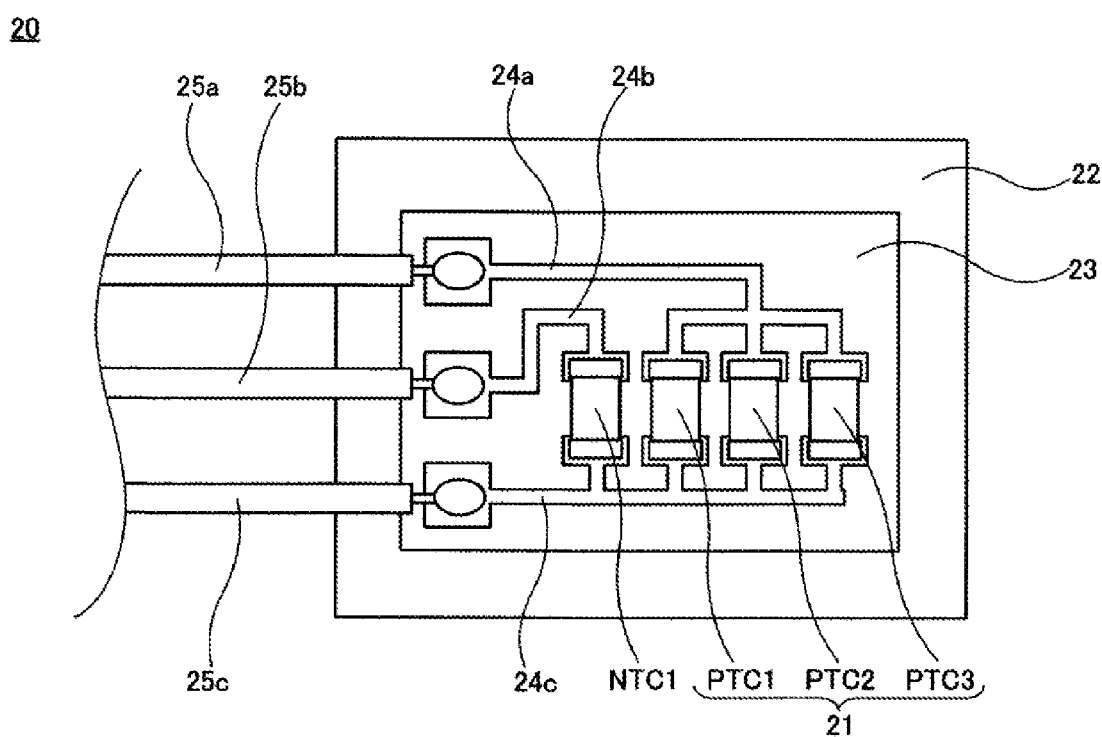
FIG. 2 is a plane view illustrating a wind speed sensor 20 of the wind speed measuring device 100.

FIG. 1 and FIG. 2 show a wind speed measuring device 100 according to a first preferred embodiment of the present invention. Here, FIG. 1 is a view of an equivalent circuit of the wind speed measuring device, and FIG. 2 is a plane view illustrating a wind speed sensor 20 of the wind speed measuring device 100.

As shown in FIG. 1, the wind speed measuring device 100 includes a constant temperature heat generating device 10. The constant temperature heat generating device 10 includes the wind speed sensor 20 and a temperature controller 30. The constant temperature heat generating device 10 includes a heat generating element 21 described below provided in the wind speed sensor 20 generate heat at a predetermined temperature or around the predetermined temperature by using the temperature controller 30.

The wind speed sensor 20 preferably includes a first negative characteristic thermistor element NTC1 and the heat generating element 21, for example. In the present preferred embodiment, the heat generating element 21 is preferably defined by three positive characteristic thermistor elements PTC1 to PTC3 connected in parallel.

FIG. 2 shows a specific example of the wind speed sensor 20. The wind speed sensor 20 includes a heat retaining plate 22 made of aluminum or other suitable material. An insulated thin circuit board 23 made of resin or other suitable material is provided on a main surface of the heat retaining plate 22. Three systems of circuit wiring lines 24a, 24b and 24c are preferably provided on the circuit board 23. One terminal of each of the positive characteristic thermistor elements PTC1 to PTC3 is connected to the circuit wiring line 24a. Further, one terminal of the first negative characteristic thermistor element NTC1 is connected to the circuit wiring line 24b. Further, another terminal of each of the positive characteristic thermistor elements PTC1 to PTC3 and another terminal of the first negative characteristic thermistor element NTC1 are connected to the circuit wiring line 24c.

The first negative characteristic thermistor element NTC1 and the heat generating element 21 (the positive characteristic thermistor elements PTC1 to PTC3) are disposed adjacent to each other and thermally coupled to each other. That is, the first negative characteristic thermistor element NTC1 is disposed so that a temperature thereof follows a temperature of the heat generating element 21.

Lead wires 25a, 25b and 25c are connected to the circuit wiring lines 24a, 24b and 24c, respectively. The lead wire 25a is connected to a switching element Q1 described below of the temperature controller 30. The lead wire 25b is connected to a resistance element R1 described below of the temperature controller 30. The lead wire 25c is connected to the ground.

As described above, after the constant temperature heat generating device 10 is stably driven after being activated and a small amount of time is passed, the heat generating element 21 (the positive characteristic thermistor elements PTC1 to PTC3) generates heat at the predetermined temperature or around the predetermined temperature. In the present preferred embodiment, the predetermined temperature is preferably set to about 40° C., for example.

When the constant temperature heat generating device 10 is turned on, the electricity is supplied to the heat generating element 21, and then the heat generating element 21 starts to generate heat. Then, when the heat generation of the heat generating element 21 is continued until the temperature of the heat generating element 21 is increased to more than about 40° C., the supply of the electricity to the heat generating element 21 is stopped, and therefore the heat generation of the heat generating element 21 is stopped. And then, after the time is passed until the temperature of the heat generating element 21 is decreased to less than about 40° C., the supply of the electricity of the heat generating element 21 is started again, and therefore the heat generating element 21 starts to generate heat again. As a result, the temperature of the heat generating element 21 is preferably maintained to about 40° C. or around about 40° C., for example.

As shown in FIG. 1, the temperature controller 30 of the constant temperature heat generating device 10 includes a power source Vcc. In the present preferred embodiment, the power source Vcc preferably supplies a direct current with 6 V. A switch SW1 as a power switch is connected to the power source Vcc. A side of the power source Vcc of the switch SW1 corresponds to an electricity input portion. Here, in the present preferred embodiment, the power source Vcc is preferably embedded into the temperature controller 30, however instead of this, only the electricity input portion may be provided in the temperature controller 30 and the electricity may be supplied to the electricity input portion from an outside.

The temperature controller 30 includes the switching element Q1. One end of the switching element Q1 is connected to the switch SW1 and another end of the switching element Q1 is connected to the heat generating element 21 of the wind speed sensor 20. The switching element Q1 is provided to turn on and off of the supply of the electricity from the power source Vcc to the heat generating element 21. In the present preferred embodiment, a PNP transistor, for example, is preferably used as the switching element Q1. Further, an NPN transistor may be used instead of the PNP transistor.

The temperature controller 30 includes the resistance element R1. The resistance element R1 is connected to the first negative characteristic thermistor element NTC1 of the wind speed sensor 20 in series so as to define a temperature detection voltage dividing circuit. In the temperature detection voltage dividing circuit, an end portion at a side of the resistance element R1 is connected to a load side (a side opposite to the power source Vcc) of the switch SW1, and an end portion at a side of the first negative characteristic thermistor element NTC1 is connected to the ground. The temperature detection voltage dividing circuit outputs a temperature detection voltage from a connection point between the resistance element R1 and the first negative characteristic thermistor element NTC1.

The temperature controller 30 preferably includes a comparison voltage dividing circuit in which a resistance element R2 and a resistance element R3 are connected in series. In the comparison voltage dividing circuit, an end portion at a side of the resistance element R2 is connected to the load side of the switch SW1, and an end portion at a side of the resistance element R3 is connected to the ground. The comparison voltage dividing circuit outputs a comparison voltage from a connection point between the resistance element R2 and the resistance element R3.

The temperature controller 30 preferably includes a comparator element Cmp1 as a voltage comparing portion. However, the voltage comparing portion is not limited to the comparator element Cmp1, an operation amplifier element, or a microcomputer may be provided instead of the comparator element Cmp1.

The connection point between the resistance element R1 and the first negative characteristic thermistor element NTC1 of the temperature detection voltage dividing circuit is connected to a reverse input terminal—of the comparator element Cmp1.

The connection point between the resistance element R2 and the resistance element R3 of the comparison voltage dividing circuit is connected to a non-reverse input terminal+of the comparator element Cmp1.

A power source terminal at a positive side of the comparator element Cmp1 is connected to the load side of the switch SW1.

A power source terminal at a negative side of the comparator element Cmp1 is connected to the ground.

An output terminal of the comparator element Cmp1 is connected to a control terminal of the switching element Q1 via a resistance element R4.

Further, a connection point between the resistance element R4 and the switching element Q1 is connected to the load side of the switch SW1 via a resistance element R5.

A preferred example of a resistance value of each of the elements defining the constant temperature heat generating device 10 (the wind speed sensor 20 and the temperature controller 30) is shown in Table 1.

TABLE 1

| | Resistance value | Voltage |
|---|---|---|
| R1 | 4.7 kΩ | << Temperature detection voltage at 40° C. >> |
| NTC1 | 5.6 kΩ (40° C.) | $\frac{5.6}{4.7+5.6} \times 6.0 \approx 3.26$ (V: 40° C.) |
| R2 | 4.7 kΩ | << Comparison voltage >> |
| R3 | 5.6 kΩ | $\frac{5.6}{4.7+5.6} \times 6.0 \approx 3.26$ (V) |
| R4 | 470 Ω | |
| R5 | 1.0 kΩ | |
| PTC1 | 4.7 Ω (25° C.) | |
| PTC2 | 4.7 Ω (25° C.) | |
| PTC3 | 4.7 Ω (25° C.) | |

As described above, in the constant temperature heat generating device 10, the set temperature is preferably set to about 40° C., for example. The first negative characteristic thermistor element NTC1 has a negative resistance temperature coefficient, and a resistance value at about 40° C., which is the set temperature of the constant temperature heat generating device 10, as a threshold resistance value. In the present preferred embodiment, as shown in the preferred example of Table 1, an element having a resistance value of about 5.6 kΩ at about 40° C. is used as the first negative characteristic thermistor element NTC1, and therefore the threshold resistance value of the first negative characteristic thermistor element NTC1 is preferably about 5.6 kΩ, for example.

The first negative characteristic thermistor element NTC1 shows the resistance value of about 5.6 kΩ as the threshold resistance value, at a temperature thereof of about 40° C. (the temperature of the heat generating element 21 is approximately 40° C.). Further, the first negative characteristic thermistor element NTC1 shows a resistance value of larger than about 5.6 kΩ as the threshold resistance value, at a temperature thereof of less than about 40° C. (the temperature of the heat generating element 21 is approximately 40° C.). Further, the first negative characteristic thermistor element NTC1 shows a resistance value of less than about 5.6 kΩ as the threshold resistance value, at a temperature thereof of more than about 40° C. (the temperature of the heat generating element 21 is approximately 40° C.)

The resistance values of the resistance element R1 of the temperature detection voltage dividing circuit and the resistance elements R2 and R3 of the comparison voltage dividing circuit described above and the voltages applied to the temperature detection voltage dividing circuit and the comparison voltage dividing circuit are set such that a temperature detection voltage and a comparison voltage are equal or substantially equal to each other (the temperature detection voltage=the comparison voltage) when the temperature of the first negative characteristic thermistor element NTC1 is the set temperature of about 40° C. and the resistance value of the first negative characteristic thermistor element NTC1 is about 5.6 kΩ as the threshold resistance value.

Specifically, as shown in the preferred example of Table 1, for example, the resistance element R1 is set to about 4.7 kΩ, the resistance element R2 is set to about 4.7 kΩ, and the resistance element R3 is set to about 5.6 kΩ.

Further, as described above, each of the one ends of the temperature detection voltage dividing circuit and the comparison voltage dividing circuit is connected to the load side of the switch SW1, and therefore when the switch SW1 which defines a power source switch is turned on, the direct current with about 6 V of the power source Vcc is applied to each of the temperature detection voltage dividing circuit and the comparison voltage dividing circuit.

As a result, the comparison voltage is always approximately 3.26 V.

Further, the temperature detection voltage is approximately 3.26 V when the temperature of the first negative characteristic thermistor element NTC1 is the set temperature of about 40° C. (the temperature of the heat generating element 21 is approximately 40° C.) and the resistance value of the first negative characteristic thermistor element NTC1 is about 5.6Ω as the threshold resistance value.

A calculation formula of the comparison voltage, and a calculation formula of the temperature detection voltage when the temperature of the first negative characteristic thermistor element NTC1 is about 40° C. are shown in the preferred example of Table 1.

The temperature detection voltage is approximately 3.26 V when the temperature of the first negative characteristic thermistor element NTC1 is about 40° C., while the temperature detection voltage becomes larger than about 3.26 V when the temperature of the first negative characteristic thermistor element NTC1 is less than 40° C. because the resistance value of the first negative characteristic thermistor element NTC1 becomes larger than about 5.6 kΩ.

On the other hand, the temperature detection voltage becomes less than about 3.26 V when the temperature of the first negative characteristic thermistor element NTC1 is more than about 40° C. because the resistance value of the first negative characteristic thermistor element NTC1 becomes less than about 5.6 kΩ.

In the constant temperature heat generating device 10, the magnitudes of the comparison voltage and the temperature detection voltage are compared with each other by the comparator element Cmp1 as the voltage comparing portion, and the temperature of the first negative characteristic thermistor element NTC1 (the temperature of the heat generating element) is detected, so that the switching element Q1 is controlled to be turned on or off.

Specifically, in a case in which the resistance value of the first negative characteristic thermistor element NTC1 is larger than about 5.6 kΩ as the threshold resistance value and the temperature detection voltage is larger than the comparison voltage (the temperature detection voltage>the comparison voltage), it is determined that the temperature of the first negative characteristic thermistor element NTC1 (the temperature of the heat generating element 21) is less than about 40° C. as the set temperature, and negative maximum voltage is output from the output terminal of the comparator element Cmp1 so as to turn on the switching element Q1, so that the electricity is supplied to the heat generating element 21 from the power source Vcc.

On the other hand, in a case in which the resistance value of the first negative characteristic thermistor element NTC1 is smaller than about 5.6 kΩ as the threshold resistance value and the temperature detection voltage is smaller than the comparison voltage (the temperature detection voltage<the comparison voltage), it is determined that the temperature of the first negative characteristic thermistor element NTC1 (the temperature of the heat generating element 21) is more than about 40° C. as the set temperature, and positive maximum voltage is output from the output terminal of the comparator element Cmp1 so as to turn off the switching element Q1, so that the supply of the electricity to the heat generating element 21 from the power source Vcc is stopped.

A function of the constant temperature heat generating device 10 having the configuration described above is straightened and described again.

When the power source switch SW1 is turned on, the electricity is supplied from the power source Vcc to the temperature detection voltage dividing circuit defined by the resistance element R1 and the first negative characteristic thermistor element NTC1 and the comparison voltage dividing circuit defined by the resistance element R2 and the resistance element R3. At this time, since the temperature of the first negative characteristic thermistor element NTC1 is less than about 40° C. as the set temperature, the resistance value of the first negative characteristic thermistor element NTC1 is larger than about 5.6 kΩ as the threshold resistance value, the temperature detection voltage is larger than the comparison voltage, and the negative maximum voltage is output from the output terminal of the comparator element Cmp1, so that the switching element Q1 is turned on. As a result, the electricity is also supplied from the power source Vcc to the heat generating element 21 through the switching element Q1.

When the electricity is supplied to the heat generating element 21, the heat generating element 21 starts to generate heat.

After the supply of the electricity is further continued, when the temperature of the heat generating element becomes more than about 40° C. as the set temperature and further the temperature of the first negative characteristic thermistor element NTC1 becomes more than about 40° C. as the set temperature, the resistance value of the first negative characteristic thermistor element NTC1 becomes less than about 5.6 kΩ as the threshold resistance value and the temperature detection voltage becomes smaller than the comparison voltage, and then the positive maximum voltage is output from the output terminal of the comparator element Cmp1, so that the switching element Q1 is turned off. As a result, the supply of the electricity to the heat generating element 21 is stopped, and the heat generation of the heat generating element 21 is stopped.

And then, when the temperature of the heat generating element is decreased, and further the temperature of the first negative characteristic thermistor element NTC1 is decreased to less than about 40° C. as the set temperature, the resistance value of the first negative characteristic thermistor element NTC1 becomes larger than about 5.6 kΩ as the threshold resistance value, and when the temperature detection voltage becomes larger than the comparison voltage, the negative maximum voltage is supplied again from the output terminal of the comparator element Cmp1, so that the switching element Q1 is turned on. As a result, the supply of the electricity to the heat generating element 21 is started again, and the heat generating element starts to generate heat again.

As described above, the constant temperature heat generating device 10 repeats to turn on and off the switching element Q1, so that a pulse voltage is applied to the heat generating element 21 from the power source Vcc. When the pulse voltage is applied to the heat generating element 21, the heat generation is repeatedly stopped and started, and therefore the temperature of the heat generating element 21 is kept around 40° C. as the set temperature.

As shown in FIG. 1, in the wind speed measuring device 100, a pulse voltage monitoring portion 40 is preferably disposed between the switching element Q1 of the temperature controller 30 of the constant temperature heat generating device 10 and the heat generating element 21 (the positive characteristic thermistor elements PTC1 to PTC3) of the wind speed sensor 20 of the constant temperature heat generating device 10. In the pulse voltage monitoring portion 40, a wave form of the pulse voltage is monitored by, for example, a counter of the microcomputer 50. The counter of the microcomputer 50 preferably includes, for example, an oscillator of about 1000 Hz so as to detect the wave form of the pulse voltage by reading a voltage value of the pulse voltage about 1000 times per one second.

Figure 3A:
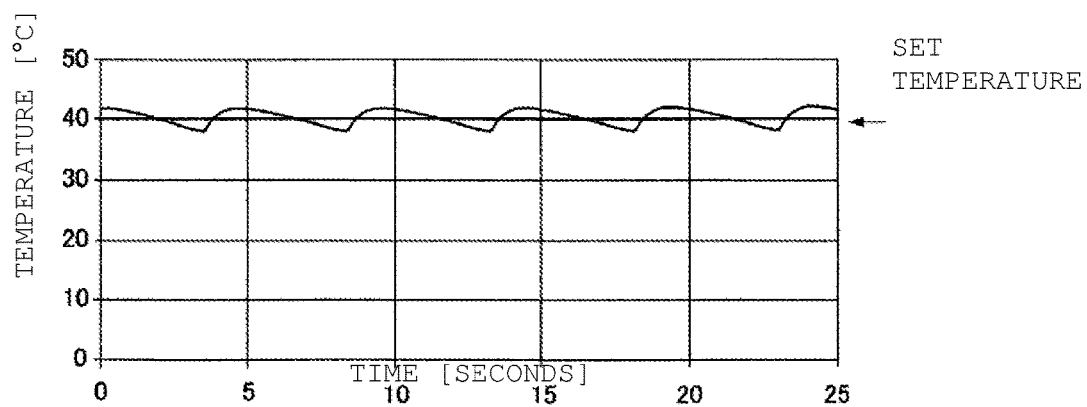
FIG. 3A is a graph illustrating a temperature change of a heat retaining plate 22 of the wind speed sensor 20 of the wind speed measuring device 100 under a certain condition.

FIG. 3A shows a graph illustrating a temperature change of the heat retaining plate 22, which is preferably made of aluminum or other suitable material, for example, of the wind speed sensor 20 after the constant temperature heat generating device 10 is stably driven after the power source switch SW1 is turned on and over ten seconds is passed. Here, the temperature of the heat retaining plate 22 was measured by a thermocouple (not shown) prepared in advance. Further, the temperature change shown in FIG. 3A was measured under a predetermined condition, and therefore the graph shows different temperature change when the condition such as the wind speed of a wind speed measurement point on which the wind speed sensor 20 is disposed is changed.

As shown in FIG. 3A, the temperature of the heat retaining plate 22 of the wind speed sensor 20 regularly repeats increase and decrease in a range between approximately 38° C. and approximately 42° C. including 40° C. as the set temperature.

Figure 3B:
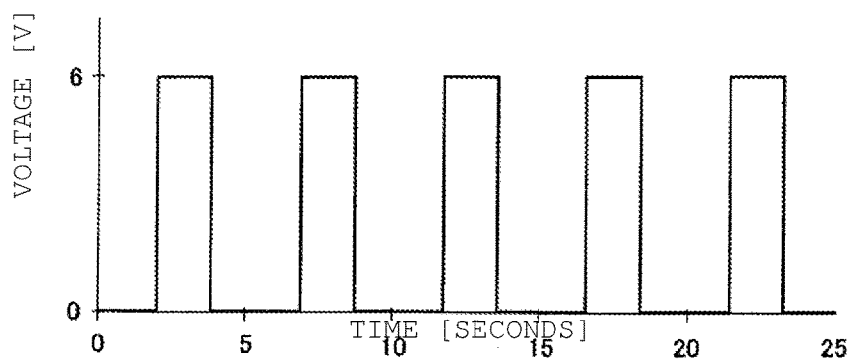
FIG. 3B is a wave form illustrating a pulse voltage applied to a heat generating element from a power source Vcc of the wind speed measuring device 100.

FIG. 3B shows a wave form of the pulse voltage applied from the power source Vcc to the heat generating element 21 (the positive characteristic thermistor elements PTC1 to PTC3) read by the microcomputer 50 in the pulse voltage monitoring portion 40 when the temperature measurement shown in FIG. 3A was performed. As shown in FIG. 3B, the pulse voltage is 6 V when the temperature of the heat retaining plate 22 of the wind speed sensor 20 becomes less than about 40° C., and the pulse voltage is about 0 V when the temperature of the heat retaining plate 22 of the wind speed sensor 20 becomes more than about 40° C.

In a case in which the wind speed sensor 20 of the wind speed measuring device 100 is disposed, for example, in a duct as a wind speed measurement point, the wave form of the pulse voltage applied from the power source Vcc to the heat generating element is regularly changed in accordance with the wind speed of gas flowing in the duct.

Figure 4:
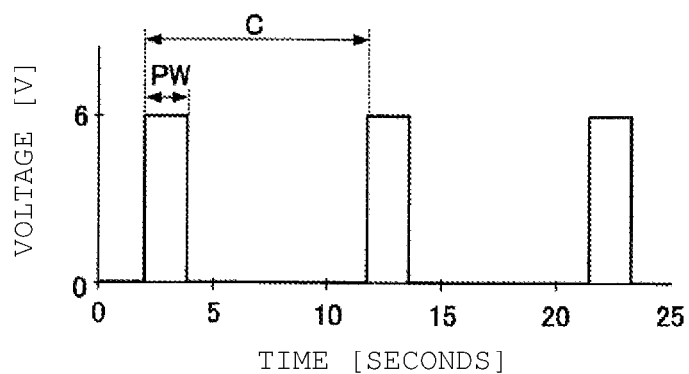
FIG. 4 shows wave forms illustrating pulse voltages applied to the heat generating element from the power source Vcc of the wind speed measuring device 100 in no wind, a weak wind, an intermediate wind, and a strong wind, respectively.
Figure 4:
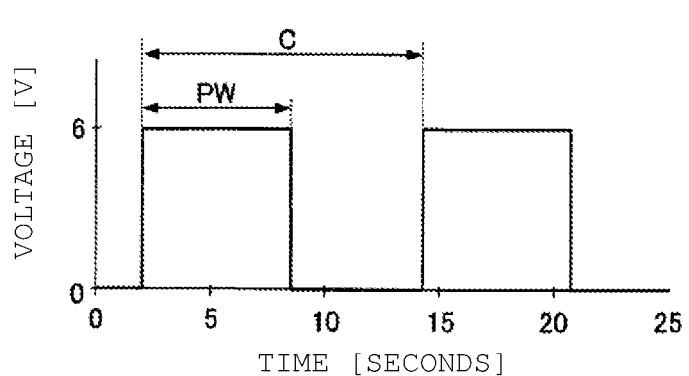
Figure 4:
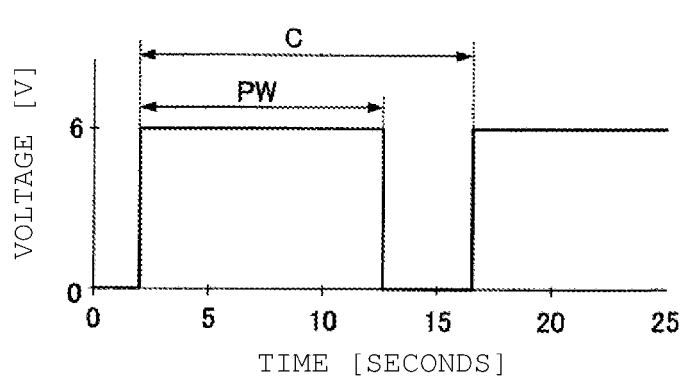
Figure 4:
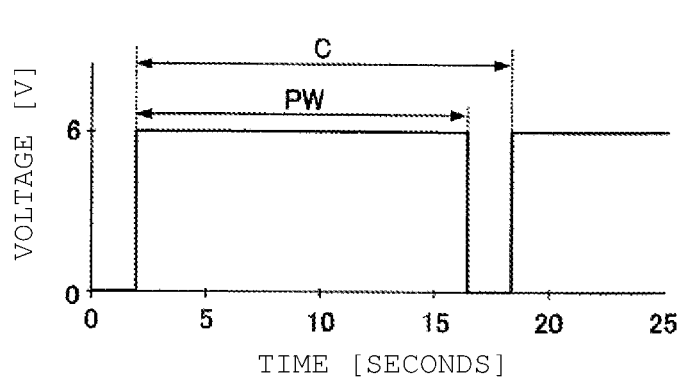

FIG. 4 shows the wave forms of the pulse voltages applied from the power source Vcc to the heat generating element 21 when the wind speed sensor 20 of the wind speed measuring device 100 is disposed in a duct (not shown) preferably made of a galvanized steel plate having, for example, a diameter of about 10 cm and a length of about 30 cm and air is forcibly supplied into the duct with a wind speed of no wind (0 m/s), a weak wind (1 m/s), an intermediate wind (about 5 m/s), and a strong wind (about 10 m/s), respectively. Here, the temperature of the air is set to a normal temperature (about 25° C.)

As shown in FIG. 4, as the wind speed becomes larger from the no wind, the weak wind, the intermediate wind, to the strong wind, a duty ratio of the wave form of the pulse voltage becomes larger. Here, the duty ratio denotes a value dividing an on-time PW of the pulse (a time or a pulse width in which the voltage is maintained to about 6 V) by a cycle C of the pulse. As the wind speed becomes larger from the no wind, the weak wind, the intermediate wind, to the strong wind, the duty ratio of the wave form of the pulse voltage becomes larger because it is considered that, as the wind speed is larger, the time for increasing the temperature of the heat retaining plate 22 by the heat generating element 21 needs much time after the pulse is turned on and further the temperature of the heat retaining plate 22 is abruptly decreased after the pulse is turned off.

Further, as shown in FIG. 4, as the wind speed becomes larger from the no wind, the weak wind, the intermediate wind, to the strong wind, the on-time PW per one time in the wave form of the pulse voltage becomes longer. As the wind speed becomes larger from the no wind, the weak wind, the intermediate wind, to the strong wind, the on-time PW per one time in the wave form of the pulse voltage becomes longer because it is considered that, as the wind speed is larger, the time for increasing the temperature of the heat retaining plate 22 by the heat generating element 21 needs much time after the pulse is turned on.

The wind speed measuring device 100 of the present preferred embodiment acquires data indicating a correlation between the wind speed and the wave form of the pulse voltage applied from the power source Vcc to the heat generating element while changing the wind speed after the wind speed sensor 20 is arranged at the wind speed measurement point prior to the use thereof. Further, when in the use, for example, the pulse voltage monitoring portion 40 reads the wave form of the pulse voltage applied from the power source Vcc to the heat generating element 21 by the microcomputer 50 and detects (measures) the wind speed at the wind speed measurement point based on the wave form of the pulse voltage. The wind speed measuring device 100 may detect the wind speed based on the duty ratio of the wave form of the pulse voltage or the on-time (the time or the pulse width in which the voltage is maintained to about 6 V) per one time in the wave form of the pulse voltage.

The wind speed measuring device 100 of the present preferred embodiment detects the wind speed based on the wave form of the pulse voltage applied from the power source Vcc to the heat generating element 21, namely based on the duty ratio or the on-time of the pulse voltage, and therefore the wind speed measuring device 100 is hardly affected by an influence of a noise and therefore is able to measure the wind speed accurately. Further, the wind speed measuring device 100 is able to be manufactured easily because of its simple configuration. Further, the wind speed measuring device 100 is able to be manufactured at a low cost because a costly component such as the A/D converter and the like is not adopted.

Further, the wind speed measuring device 100 of the present preferred embodiment includes the positive characteristic thermistor elements PTC1 to PTC3 as a heat generating element, and therefore even if the temperature of the heat generating element is increased abnormally more than the set temperature due to the failure thereof, the resistance value of each of the positive characteristic thermistor elements PTC1 to PTC3 is increased so that the further temperature increase is able to be reduced or prevented. Consequently, high safety is able to be obtained.

In a case in which the wind speed sensor 20 of the wind speed measuring device 100 of the present preferred embodiment is disposed in, for example, a duct, the wind speed of gas passing through the duct is able to be accurately measured without being affected by the influence of a noise. Further, in a case in which an abnormality (block because of a foreign substance) is caused in the duct, the abnormality is able to be detected easily. That is, for example, in a case in which the assumed wind speed is not shown by the wind speed measuring device 100 while a ventilator connected to the duct is activated normally, it is able to be determined that the abnormality in the duct may be caused.

Further, in the present preferred embodiment, the wind speed is measured by the wind speed measuring device 100. In addition, the airflow is able to be measured by the wind speed measuring device 100. That is, the wind speed measuring device 100 acquires data indicating a correlation between the airflow and the wave form of the pulse voltage applied from the power source Vcc to the heat generating element while changing the airflow after the wind speed sensor 20 is disposed at an airflow measurement point prior to the use thereof. Further, when in the use, for example, the pulse voltage monitoring portion 40 reads the wave form of the pulse voltage applied from the power source Vcc to the heat generating element 21 by the microcomputer 50 and detects (measures) the airflow at the airflow measurement point based on the wave form of the pulse voltage, so that the wind speed measuring device 100 is able to measure the airflow.

Second Preferred Embodiment

Figure 5:
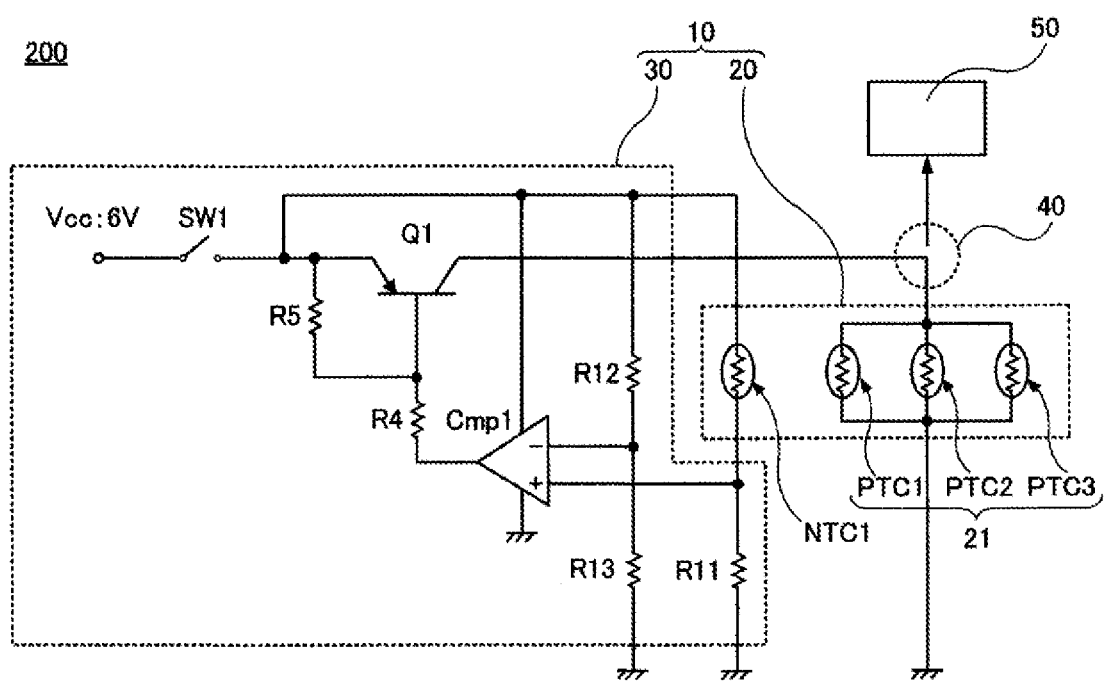
FIG. 5 is an equivalent circuit illustrating a wind speed measuring device 200 according to a second preferred embodiment of the present invention.

FIG. 5 shows a wind speed measuring device 200 according to a second preferred embodiment of the present invention. Here, FIG. 5 shows an equivalent circuit of the wind speed measuring device 200.

The wind speed measuring device 200 is preferably defined by modifying the temperature detection voltage dividing circuit, the comparison voltage dividing circuit and the like of the wind speed measuring device 100 according to the first preferred embodiment.

Specifically, in the wind speed measuring device 200, the temperature detection voltage dividing circuit is defined by connecting the first negative characteristic thermistor element NTC1 and a resistance element R11 in series, and an end portion at a side of the first negative characteristic thermistor element NTC1 is connected to a load side (a side opposite to the power source Vcc) of the switch SW1 and an end portion of the resistance element R11 is connected to the ground. Further, a connection point between the first negative characteristic thermistor element NTC1 and the resistance element R11 of the temperature detection voltage dividing circuit is connected to the non-reverse input terminal+of the comparator element Cmp1, contrary to the wind speed measuring device 100.

Further, in the wind speed measuring device 200, the comparison voltage dividing circuit is defined by connecting a resistance element R12 and a resistance element R13 in series, and an end portion at a side of the resistance element R12 is connected to the load side of the switch SW1 and an end portion at a side of the resistance element R13 is connected to the ground. Further, a connection point between the resistance element R12 and the resistance element R13 of the comparison voltage dividing circuit is connected to the reverse input terminal—of the comparator element Cmp1, contrary to the wind speed measuring device 100.

A preferred example of a resistance value of each of the elements defining the constant temperature heat generating device 10 (the wind speed sensor 20 and the temperature controller 30) of the wind speed measuring device 200 is shown in Table 2.

TABLE 2

| | Resistance value | Voltage |
|---|---|---|
| NTC1 | 5.6 kΩ (40° C.) | << Temperature detection voltage at 40° C. >> |
| R11 | 4.7 kΩ | $\frac{4.7}{5.6+4.7} \times 6.0 \approx 2.74$ (V: 40° C.) |
| R12 | 5.6 kΩ | << Comparison voltage >> |
| R13 | 4.7 kΩ | $\frac{4.7}{5.6+4.7} \times 6.0 \approx 2.74$ (V) |
| R4 | 470 Ω | |
| R5 | 1.0 kΩ | |
| PTC1 | 4.7 Ω (25° C.) | |
| PTC2 | 4.7 Ω (25° C.) | |
| PTC3 | 4.7 Ω (25° C.) | |

Similar to the wind speed measuring device 100, in the wind speed measuring device 200, the set temperature of the constant temperature heat generating device 10 is preferably set to about 40° C., for example.

Similar to the wind speed measuring device 100, an element preferably having a resistance value of about 5.6 kΩ at about 40° C., for example, is used as the first negative characteristic thermistor element NTC1, and therefore the threshold resistance value of the first negative characteristic thermistor element NTC1 is about 5.6 kΩ.

The first negative characteristic thermistor element NTC1 shows the resistance value of about 5.6 kΩ as the threshold resistance value, at a temperature thereof of about 40° C. Further, the first negative characteristic thermistor element NTC1 shows a resistance value of larger than about 5.6 kΩ as the threshold resistance value, at a temperature thereof of less than about 40° C. Further, the first negative characteristic thermistor element NTC1 shows a resistance value of less than about 5.6 kΩ as the threshold resistance value, at a temperature thereof of more than about 40° C.

As shown in the preferred example of Table 2, in the wind speed measuring device 200, preferably, the resistance element R11 is set to about 4.7 kΩ, the resistance element R12 is set to about 5.6 kΩ, and the resistance element R13 is set to about 4.7 kΩ.

In the wind speed measuring device 200, the comparison voltage is preferably always approximately 2.74 V, for example.

Further, the temperature detection voltage is approximately 2.74 V when the temperature of the first negative characteristic thermistor element NTC1 is the set temperature of 40° C. and the resistance value of the first negative characteristic thermistor element NTC1 is about 5.6Ω as the threshold resistance value.

A calculation formula of the comparison voltage, and a calculation formula of the temperature detection voltage when the temperature of the first negative characteristic thermistor element NTC1 is about 40° C. are shown in the preferred example of Table 2.

The temperature detection voltage is approximately 2.74 V when the temperature of the first negative characteristic thermistor element NTC1 is about 40° C., while the temperature detection voltage becomes smaller than 2.74 V when the temperature of the first negative characteristic thermistor element NTC1 is less than about 40° C. because the resistance value of the first negative characteristic thermistor element NTC1 becomes larger than about 5.6 kΩ. This behavior is opposite to that of the wind speed measuring device 100 of the first preferred embodiment because a configuration and a wire arrangement of the temperature detection voltage dividing circuit are different from those of the wind speed measuring device 100 of the first preferred embodiment.

Further, on the other hand, when the temperature of the first negative characteristic thermistor element NTC1 is more than about 40° C., the resistance value of the first negative characteristic thermistor element NTC1 becomes smaller than about 5.6 kΩ, and therefore the temperature detection voltage becomes larger than about 2.74 V. This behavior is also opposite to that of the wind speed measuring device 100 of the first preferred embodiment because the configuration and the wire arrangement of the temperature detection voltage dividing circuit are different from those of the wind speed measuring device 100 of the first preferred embodiment.

Also in the wind speed measuring device 200, the magnitudes of the comparison voltage and the temperature detection voltage are preferably compared with each other by the comparator element Cmp1, and the temperature of the first negative characteristic thermistor element NTC1 is detected, so that the switching element Q1 is controlled to be turned on or off.

Specifically, in a case in which the resistance value of the first negative characteristic thermistor element NTC1 is larger than about 5.6 kΩ as the threshold resistance value and the temperature detection voltage is smaller than the comparison voltage (the temperature detection voltage<the comparison voltage), it is determined that the temperature of the first negative characteristic thermistor element NTC1 is less than 40° C. as the set temperature, and the negative maximum voltage is output from the output terminal of the comparator element Cmp1 so as to turn on the switching element Q1, so that the electricity is supplied to the heat generating element 21 (the positive characteristic thermistor elements PTC1 to PTC3) from the power source Vcc.

On the other hand, in a case in which the resistance value of the first negative characteristic thermistor element NTC1 is less than about 5.6 kΩ as the threshold resistance value and the temperature detection voltage is larger than the comparison voltage (the temperature detection voltage>the comparison voltage), it is determined that the temperature of the first negative characteristic thermistor element NTC1 is more than 40° C. as the set temperature, and the positive maximum voltage is output from the output terminal of the comparator element Cmp1 so as to turn off the switching element Q1, so that the supply of the electricity to the heat generating element 21 from the power source Vcc is stopped.

The constant temperature heat generating device 10 of the wind speed measuring device 200 includes the temperature detection voltage dividing circuit and the comparison voltage dividing circuit having configurations and wire arrangements different from those in the constant temperature heat generating device 10 of the wind speed measuring device 100. However, similar to the constant temperature heat generating device 10 of the wind speed measuring device 100, the heat generating element 21 generates heat around 40° C. as the set temperature.

Similar to the wind speed measuring device 100 according to the first preferred embodiment, in the wind speed measuring device 200, for example, the pulse voltage monitoring portion 40 preferably reads the wave form of the pulse voltage applied from the power source Vcc to the heat generating element by the microcomputer 50 and therefore is able to detect (measure) the wind speed at the wind speed measurement point based on the wave form of the pulse voltage.

Third Preferred Embodiment

Figure 6:
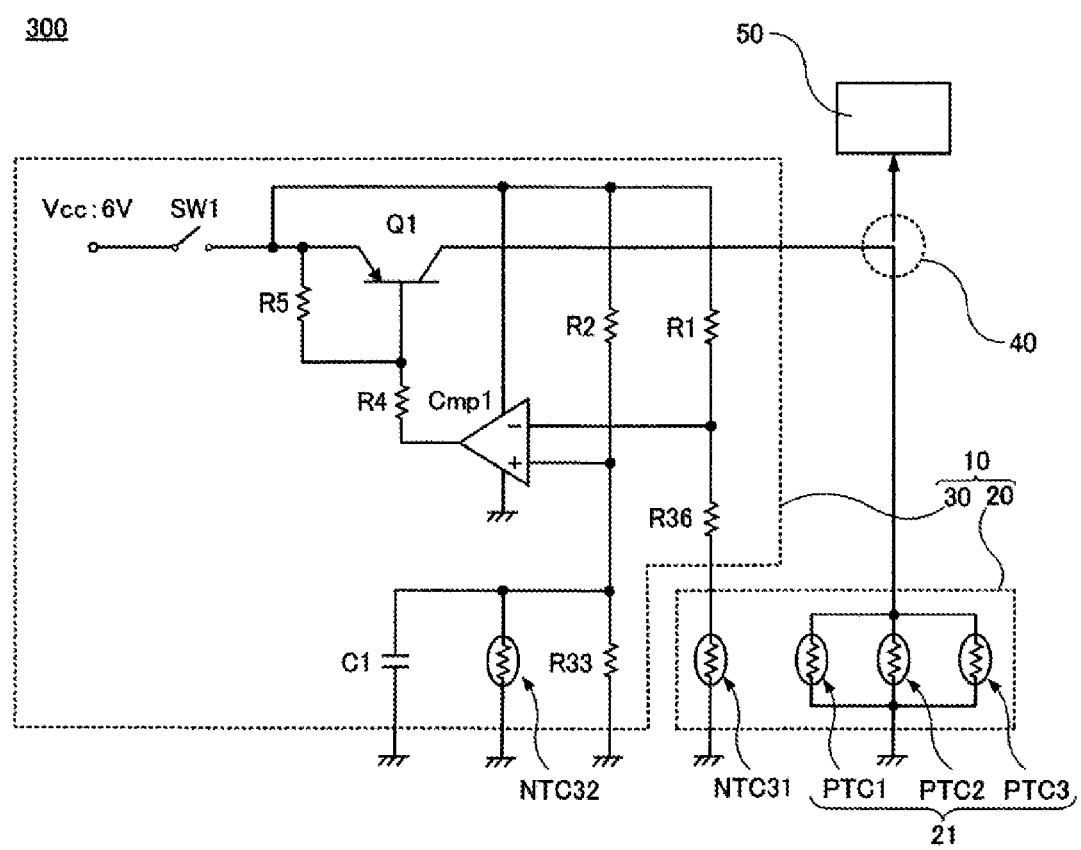
FIG. 6 is an equivalent circuit illustrating a wind speed measuring device 300 according to a third preferred embodiment of the present invention.

FIG. 6 shows a wind speed measuring device 300 according to a third preferred embodiment. Here, FIG. 6 shows an equivalent circuit of the wind speed measuring device 300.

In the wind speed measuring device 300, a second negative characteristic thermistor element NTC32 that provides temperature compensation, for example, is added to the wind speed measuring device 100 according to the first preferred embodiment in order to correct a measurement error of the wind speed caused by the temperature of the wind to be measured.

Specifically, the wind speed measuring device 100 includes the resistance element R3 in the comparison voltage dividing circuit, while the wind speed measuring device 300 includes a resistance element R33, the second negative characteristic thermistor element NTC32 and a condenser C1 connected in parallel to each other, in the comparison voltage dividing circuit instead of the resistance element R3. Here, the second negative characteristic thermistor element NTC32 is preferably arranged near the wind speed sensor 20 to be thermally isolated from the positive characteristic thermistor elements PTC1 to PTC3 of the wind speed sensor 20. That is, the second negative characteristic thermistor element NTC32 is arranged so that a temperature thereof does not to follow the temperature of the positive characteristic thermistor elements PTC1 to PTC3. Further, the second negative characteristic thermistor element NTC32 changes the temperature thereof in accordance with the temperature of the wind to be measured so as to change the resistance thereof. Each of functions of the resistance element R33 and the second negative characteristic thermistor element NTC32 is described below. Here, the condenser C1 is connected to the resistance element R33 and the second negative characteristic thermistor element NTC32 in parallel in order to improve a noise resistance.

Further, in the wind speed measuring device 300, a resistance element R36 is newly provided to be connected to the first negative characteristic thermistor element NTC31 in series, near the first negative characteristic thermistor element NTC31 of the temperature detection voltage dividing circuit of the wind speed measuring device 100. Here, the resistance element R36 is disposed at a side of the first negative characteristic thermistor element NTC31 (at a ground side) with respect to the connection point between the temperature detection voltage dividing circuit and the non-reverse input terminal of the comparator element Cmp1. The resistance element R36 adjusts the temperature detection voltage.

A preferred example of a resistance value and a capacitance value of each element of the wind speed measuring device 300 are shown in Table 3.

TABLE 3

| | Resistance value | Voltage |
|---|---|---|
| R1 | 4.7 kΩ | << Temperature detection voltage at NTC31 = 40° C. + 10° C. = 50° C. Larger than NTC32 by 10° C. >> |
| NTC31 | 4.2 kΩ (50° C.) | |
| R36 | 1.0 kΩ | $\frac{4.2 + 1.0}{4.7 + 4.2 + 1.0} \times 6.0 \approx 3.10$ (V: 50° C.) |
| R2 | 4.7 kΩ | << Comparison voltage at NTC32 = 40° C. >> |
| R33 | 39 kΩ | |
| NTC32 | 5.6 kΩ (40° C.) | $\dfrac{\dfrac{1}{\frac{1}{39}+\frac{1}{5.6}}}{4.7 + \dfrac{1}{\frac{1}{39}+\frac{1}{5.6}}}$ |
| C1 | 0.47 μF | |
| R4 | 470 Ω | |
| R5 | 1.0 kΩ | |
| PTC1 | 4.7 Ω (25° C.) | |
| PTC2 | 4.7 Ω (25° C.) | |
| PTC3 | 4.7 Ω (25° C.) | |

Here, elements having the same or substantially the same electrical characteristics, such as a resistance temperature characteristic, are provided in the first negative characteristic thermistor element NTC31 and the second negative characteristic thermistor element NTC32. The preferred example of Table 4 shows the resistance temperature characteristics of the first negative characteristic thermistor element NTC31 and the second negative characteristic thermistor element NTC32.

TABLE 4

| Resistance temperature characteristic of NTC31/NTC32 | |
|---|---|
| 25° C. | 10 kΩ |
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

Hereinafter, a principle in which the measurement error of the wind speed caused by the temperature of the wind to be measured is corrected in the wind speed measuring device 300 is described.

For example, in a case in which the wind speed measuring device 100 according to the first preferred embodiment is designed such that the temperature of the wind is set (assumed) to a normal temperature of about 25° C., when the temperature of the wind is more than about 25° C., the detected duty ratio of the wave form of the pulse voltage becomes smaller than the actual duty ratio corresponding to the wind speed due to the influence of the temperature of the wind. On the other hand, when the temperature of the wind is less than about 25° C., the detected duty ratio of the wave form of the pulse voltage becomes larger than the actual duty ratio corresponding to the wind speed due to the influence of the temperature of the wind.

Figure 7:
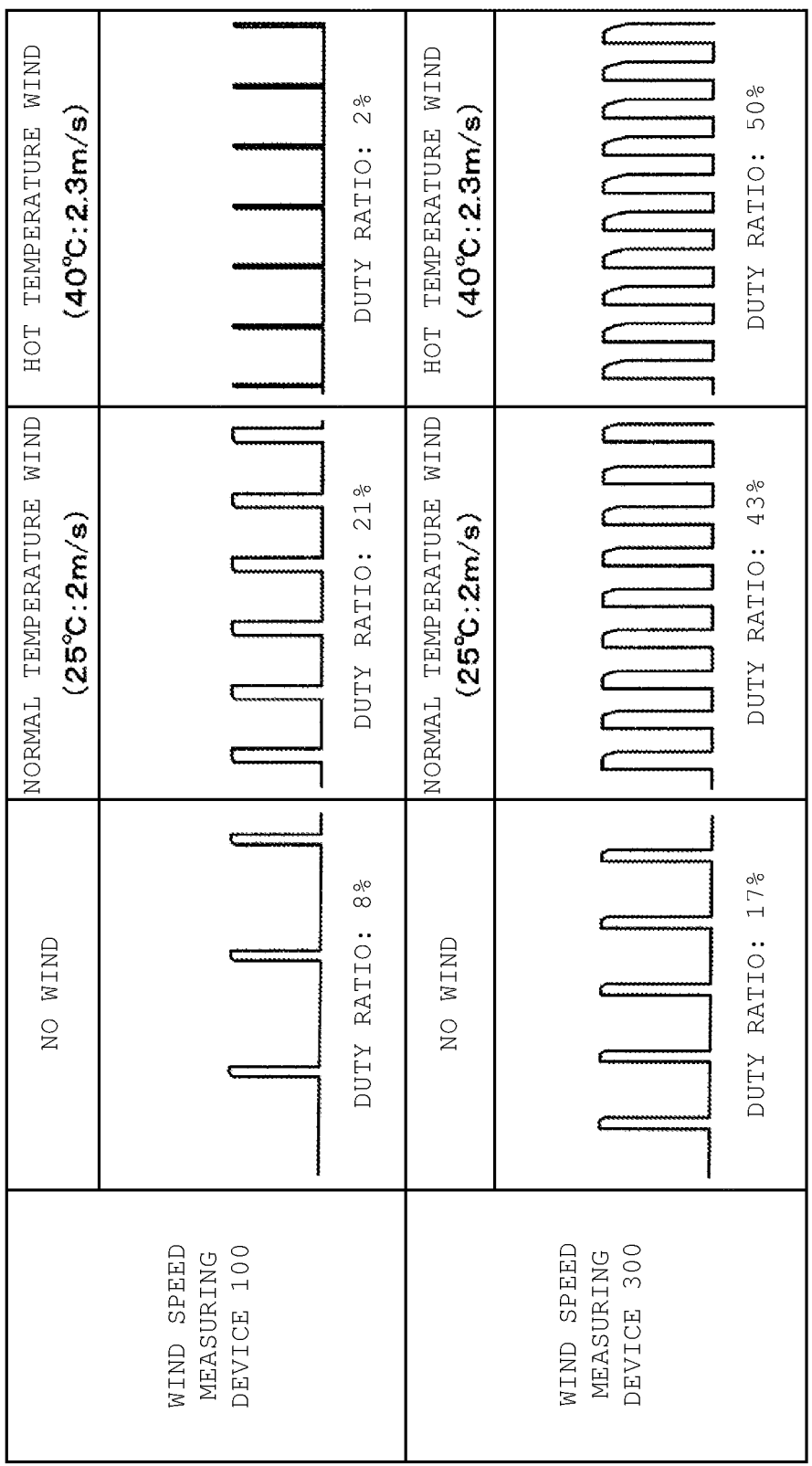
FIG. 7 is a graph illustrating wave forms of pulse voltages when the wind speed measuring device 100 and the wind speed measuring device 300 receive no wind, an ordinary temperature wind, and a hot wind, respectively.

FIG. 7 (upper portion) shows a wave form of the pulse voltage in a no wind state, a wave form of the pulse voltage in a normal temperature wind (about 25° C.) with a wind speed of about 2 m/s, and a wave form of the pulse voltage in a hot wind (about 40° C.) with a wind speed of about 2.3 m/s, each of which was detected by the wind speed measuring device 100. Here, the wind speeds of the normal temperature wind and the hot wind are slightly different because of convenience of an experimental device. The duty ratio of the wave form of the pulse voltage in the no wind state is about 8%, while the duty ratio of the wave form of the pulse voltage in the normal temperature wind (about 25° C.) is about 21%. This is because, compared to a case in the no wind state, in a case in which the heat retaining plate 22 receives the normal temperature wind, much time is needed to increase the temperature of the heat retaining plate 22 by the heat generating element 21 after the pulse is turned on and the temperature of the heat retaining plate 22 is abruptly decreased after the pulse is turned off. On the other hand, the duty ratio of the wave form of the pulse voltage in the hot wind (about 40° C.) is about 2%, which is contrarily smaller than the duty ratio of about 8% of the wave form of the pulse voltage in the no wind state. This is because the heat retaining plate 22 is not cooled but heated by the hot wind (about 40° C.), and therefore, compared to a case in the no wind state, in a case in which the heat retaining plate 22 receives the hot air, less time is needed to increase the temperature of the heat retaining plate 22 after the pulse is turned on and the temperature of the heat retaining plate 22 is not abruptly decreased after the pulse is turned off.

The wind speed measuring device 300 corrects the measurement error of the wind speed caused by the temperature of the wind to be measured as described above by using the resistance change of the second negative characteristic thermistor element NTC32. Specifically, a set value of a control temperature is defined by a temperature difference of 10° C. between the first negative characteristic thermistor element NTC31 and the second negative characteristic thermistor element NTC32. That is, it is controlled to maintain (the temperature of the first negative characteristic thermistor element NTC31)−(the temperature of the second negative characteristic thermistor element NTC32)≈10° C.

In the wind speed measuring device 300, when the temperature of the first negative characteristic thermistor element NTC31 is about 50° C. (=about 40° C.+about 10° C.), the temperature detection voltage is calculated from the resistance value of the resistance element R1, the resistance value of the resistance element R36, and the resistance value of the first negative characteristic thermistor element NTC31 at about 50° C., namely the temperature detection voltage is approximately 3.10 V as shown in the preferred example of Table 3. Further, in the wind speed measuring device 300, the comparison voltage when the temperature of the second negative characteristic thermistor element NTC32 is 40° C. is calculated from the resistance value of the resistance element R2, the resistance value of the resistance element R33, and the resistance value of the second negative characteristic thermistor element NTC32 at about 40° C., namely the comparison voltage is approximately 3.10 V as shown in the preferred example of Table 3.

FIG. 7 (lower portion) shows a wave form of the pulse voltage in a no wind state, a wave form of the pulse voltage in a normal temperature wind (about 25° C.) with a wind speed of about 2 m/s, and a wave form of the pulse voltage in a hot wind (about 40° C.) with a wind speed of about 2.3 m/s, each of which was detected by the wind speed measuring device 300. The duty ratio of the wave form of the pulse voltage in the no wind state is about 17%, while the duty ratio of the wave form of the pulse voltage in the normal temperature wind (about 25° C.) is about 43% and the duty ratio of the wave form of the pulse voltage in the hot wind (about 40° C.) is about 50%. That is, the duty ratio of the wave form of the pulse voltage in the normal temperature wind and the duty ratio of the wave form of the pulse voltage in the hot wind are close to each other, and therefore it was discovered that the measurement error of the wind speed caused by the temperature of the wind to be measured is corrected. Here, the duty ratio in the normal temperature wind and the duty ratio in the hot wind are not completely matched with each other because the wind speeds thereof are slightly different from each other.

As described above, in the wind speed measuring device 300 according to the third preferred embodiment, the set temperature (the temperature of the first negative characteristic thermistor element NTC31) is controlled to be larger than the temperature of the second negative characteristic thermistor element NTC32, and to be different from the temperature of the second negative characteristic thermistor element NTC32 by a temperature difference of approximately 10° C., and to be changed while keeping the temperature difference of approximately 10° C. in accordance with the temperature change of the second negative characteristic thermistor element NTC32. The wind speed measuring device 300 corrects the measurement error of the wind speed caused by the temperature of the wind to be measured by arranging the second negative characteristic thermistor element NTC32.

Further, in the wind speed measuring device 300, the measurement error of the wind speed caused by the temperature of the wind to be measured is corrected by adding the second negative characteristic thermistor element NTC32 and the like to the wind speed measuring device 100 according to the first preferred embodiment. Instead of this, the measurement error of the wind speed caused by the temperature of the wind to be measured may be corrected by adding the second negative characteristic thermistor element NTC32, for example, to the wind speed measuring device 200 according to the second preferred embodiment.

Fourth Preferred Embodiment

Figure 8:
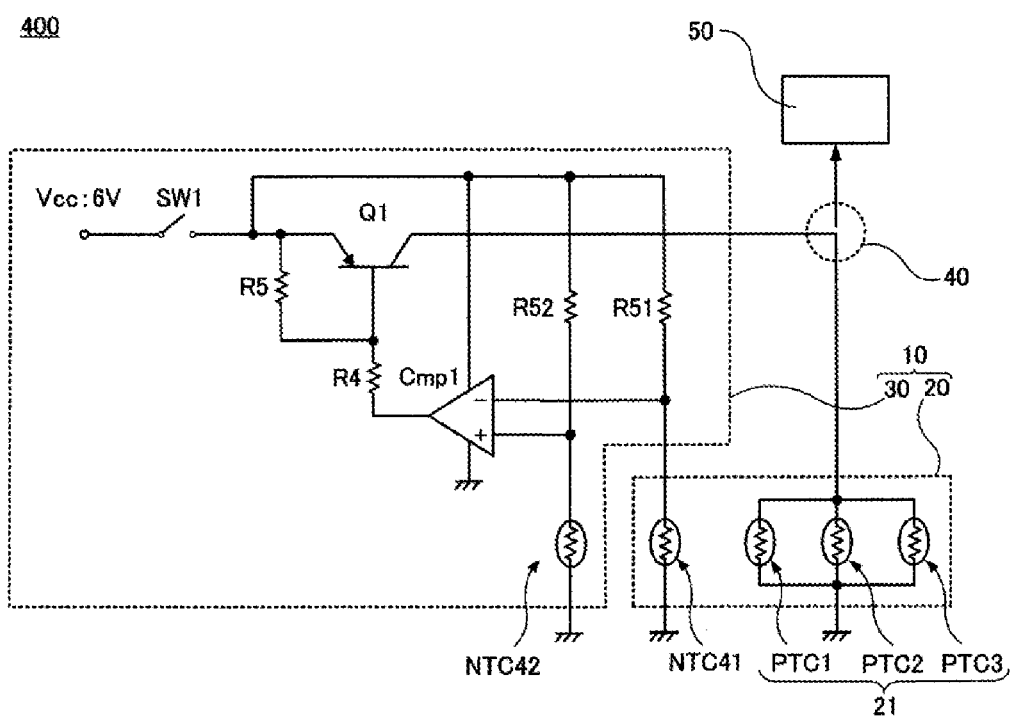
FIG. 8 is an equivalent circuit illustrating a wind speed measuring device 400 according to a fourth preferred embodiment of the present invention.

FIG. 8 shows a wind speed measuring device 400 according to a fourth preferred embodiment. Here, FIG. 8 shows an equivalent circuit of the wind speed measuring device 400.

The wind speed measuring device 400 is defined by further modifying the wind speed measuring device 300 according to the third preferred embodiment. Specifically, in the wind speed measuring device 400, the comparison voltage dividing circuit preferably is defined by a resistance element R52, and a second negative characteristic thermistor element NTC42 that provides temperature compensation connected in series. Further, the temperature detection voltage dividing circuit is defined by a resistance element R51, and a first negative characteristic thermistor element NTC41.

Further, in the wind speed measuring device 400, the temperature difference between the first negative characteristic thermistor element NTC41 and the second negative characteristic thermistor element NTC42 is preferably controlled to be about 10° C., for example, by appropriately selecting a resistance value of the resistance element R51, a resistance value of the resistance element R52, a resistance temperature characteristic of the first negative characteristic thermistor element NTC41, and a resistance temperature characteristic of the second negative characteristic thermistor element NTC42.

The resistance value of the resistance element R51, the resistance value of the resistance element R52, the resistance temperature characteristic of the first negative characteristic thermistor element NTC41, and the resistance temperature characteristic of the second negative characteristic thermistor element NTC42 are shown in the preferred example of Table 5. Further, an element having the same resistance temperature characteristic as that of the first negative characteristic thermistor element NTC31 and the second negative characteristic thermistor element NTC32 is adopted in each of the first negative characteristic thermistor element NTC41 and the second negative characteristic thermistor element NTC42.

TABLE 5

| | Resistance value |
|---|---|
| R51 | 8.2 kΩ |
| R52 | 12 kΩ |
| Resistance temperature characteristic of NTC41/NTC42 | |
| 25° C. | 10 kΩ |
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

In the wind speed measuring device 400 according to the fourth preferred embodiment, similar to the wind speed measuring device 300 according to the third preferred embodiment, the set temperature (the temperature of the first negative characteristic thermistor element NTC41) is controlled to be larger than the temperature of the second negative characteristic thermistor element NTC42, and to be different from the temperature of the second negative characteristic thermistor element NTC42 by a temperature difference of approximately 10° C., and to be changed while keeping the temperature difference of approximately 10° C. in accordance with the temperature change of the second negative characteristic thermistor element NTC42.

Further, the wind speed measuring device 400 is preferably defined based on the wind speed measuring device 100 according to the first preferred embodiment. Instead of this, the wind speed measuring device 400 may be defined based on the wind speed measuring device 200 according to the second preferred embodiment.

The wind speed measuring device 400 is able to correct an influence of the temperature of the wind whose wind speed is to be measured and is able to measure the wind speed further accurately without increasing the number of components.

Fifth Preferred Embodiment

Figure 9:
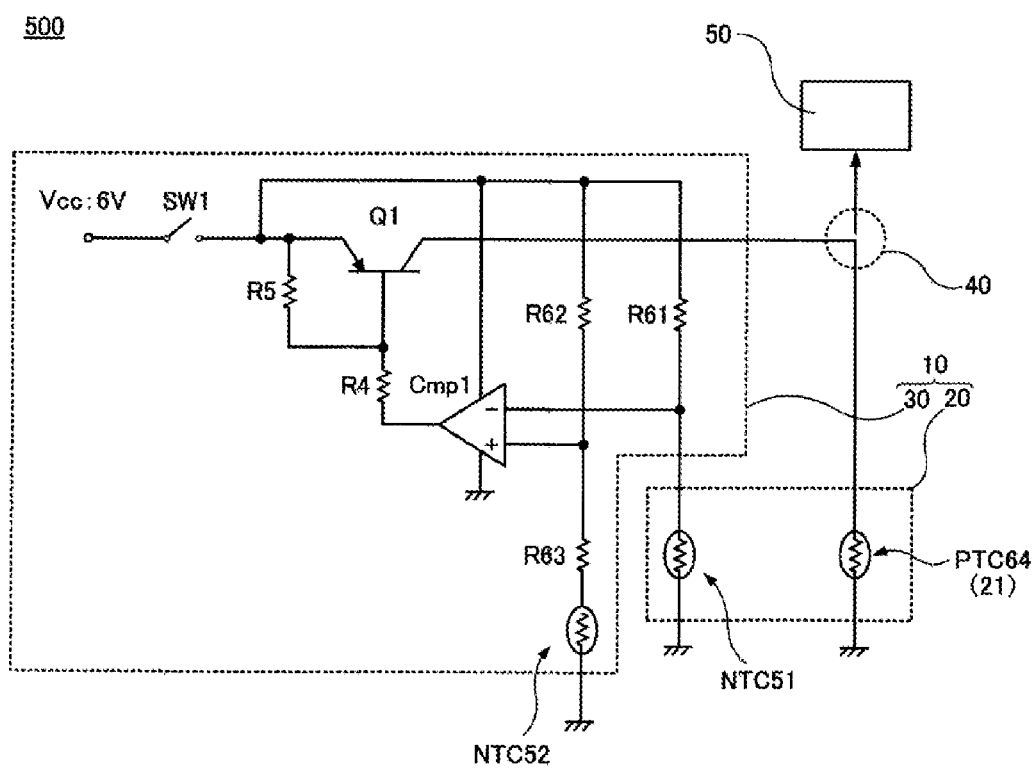
FIG. 9 is an equivalent circuit illustrating a wind speed measuring device 500 according to a fifth preferred embodiment of the present invention.

FIG. 9 shows a wind speed measuring device 500 according to a fifth preferred embodiment. Here, FIG. 9 shows an equivalent circuit of the wind speed measuring device 500.

The wind speed measuring device 500 is preferably defined by further modifying the wind speed measuring device 400 according to the fourth preferred embodiment. Specifically, in the wind speed measuring device 400, the comparison voltage dividing circuit is preferably defined by a voltage dividing circuit of the resistance element R52, and the second negative characteristic thermistor element NTC42 that provides temperature compensation, while in the wind speed measuring device 500, the comparison voltage dividing circuit is defined by a voltage dividing circuit of a resistance element R62, and a resistance element R63 and a second negative characteristic thermistor element NTC52 that provides temperature compensation connected in series.

Further, in the wind speed measuring device 500, the temperature detection voltage dividing circuit is defined by a voltage dividing circuit of a resistance element R61 and a first negative characteristic thermistor element NTC51. Further, in the wind speed measuring device 500, the heat generating element 21 is defined by one positive characteristic thermistor element PTC64.

The resistance value of the resistance element R61, the resistance value of the resistance element R62, the resistance value of the resistance element R63, the resistance value of the positive characteristic thermistor element PTC64, the resistance temperature characteristic of the first negative characteristic thermistor element NTC51, and the resistance temperature characteristic of the second negative characteristic thermistor element NTC52 are preferably as shown in the preferred example of Table 6.

TABLE 6

| | Resistance value |
|---|---|
| R61 | 22 kΩ |
| R62 | 33 kΩ |
| R63 | 1 kΩ |
| PTC64 | 68Ω (25° C.) |
| Resistance temperature characteristic of NTC51/NTC52 | |
| 25° C. | 10 kΩ |
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

In the wind speed measuring device 400 according to the fourth preferred embodiment described above, the set temperature (the temperature of the first negative characteristic thermistor element NTC41) is controlled to be changed while keeping the temperature difference of approximately 10° C. with the temperature of the second negative characteristic thermistor element NTC42 by appropriately selecting the resistance value of the resistance element R51, the resistance value of the resistance element R52, the resistance temperature characteristic of the first negative characteristic thermistor element NTC41, and the resistance temperature characteristic of the second negative characteristic thermistor element NTC42.

On the other hand, in the wind speed measuring device 500, the set temperature (the temperature of the first negative characteristic thermistor element NTC51) is controlled to be larger than the temperature of the second negative characteristic thermistor element NTC52, and to be changed in accordance with the temperature change of the second negative characteristic thermistor element NTC52 such that the temperature difference between the set temperature and the temperature of the second negative characteristic thermistor element NTC52 becomes smaller as the temperature of the second negative characteristic thermistor element NTC52 is increased, and the temperature difference between the set temperature and the temperature of the second negative characteristic thermistor element NTC52 becomes larger as the temperature of the second negative characteristic thermistor element NTC52 is decreased by setting the resistance value or the like of each of the elements as shown in the preferred example of Table 6.

For example, in the wind speed measuring device 500, the temperature difference between the set temperature and the second negative characteristic thermistor element NTC52 is preferably controlled to be about 10° C., for example, when the temperature of the second negative characteristic thermistor element NTC52 is about 25° C., while the temperature difference between the set temperature and the second negative characteristic thermistor element NTC52 is preferably controlled to be about 9° C., for example, when the temperature of the second negative characteristic thermistor element NTC52 is about 50° C. Here, the temperature difference of about 10° C. and the temperature difference of about 9° C. are described as examples for description.

The positive characteristic thermistor element is provided such that the resistance value becomes larger when the temperature is increased, and therefore the heat is hardly generated. Accordingly, in a case in which the positive characteristic thermistor element PTC64 is adopted as the heat generating element 21, there is a problem that the on-time of the pulse voltage becomes longer more than that corresponding to the actual wind speed as the temperature of the second negative characteristic thermistor element NTC52 is increased. However, by controlling the set temperature such that the temperature difference between the set temperature and the temperature of the second negative characteristic thermistor element NTC52 becomes smaller as the temperature of the second negative characteristic thermistor element NTC52 is increased, and the temperature difference between the set temperature and the temperature of the second negative characteristic thermistor element NTC52 becomes larger as the temperature of the second negative characteristic thermistor element NTC52 is decreased as described above, when the temperature of the second negative characteristic thermistor element NTC52 becomes high, the set temperature is able to be adjusted to be low and the on-time of the pulse voltage is able to be corrected to be short. Consequently, the measurement error of the wind speed caused by using the positive characteristic thermistor element PTC64 as the heat generating element 21 is able to be corrected.

Sixth Preferred Embodiment

Figure 10:
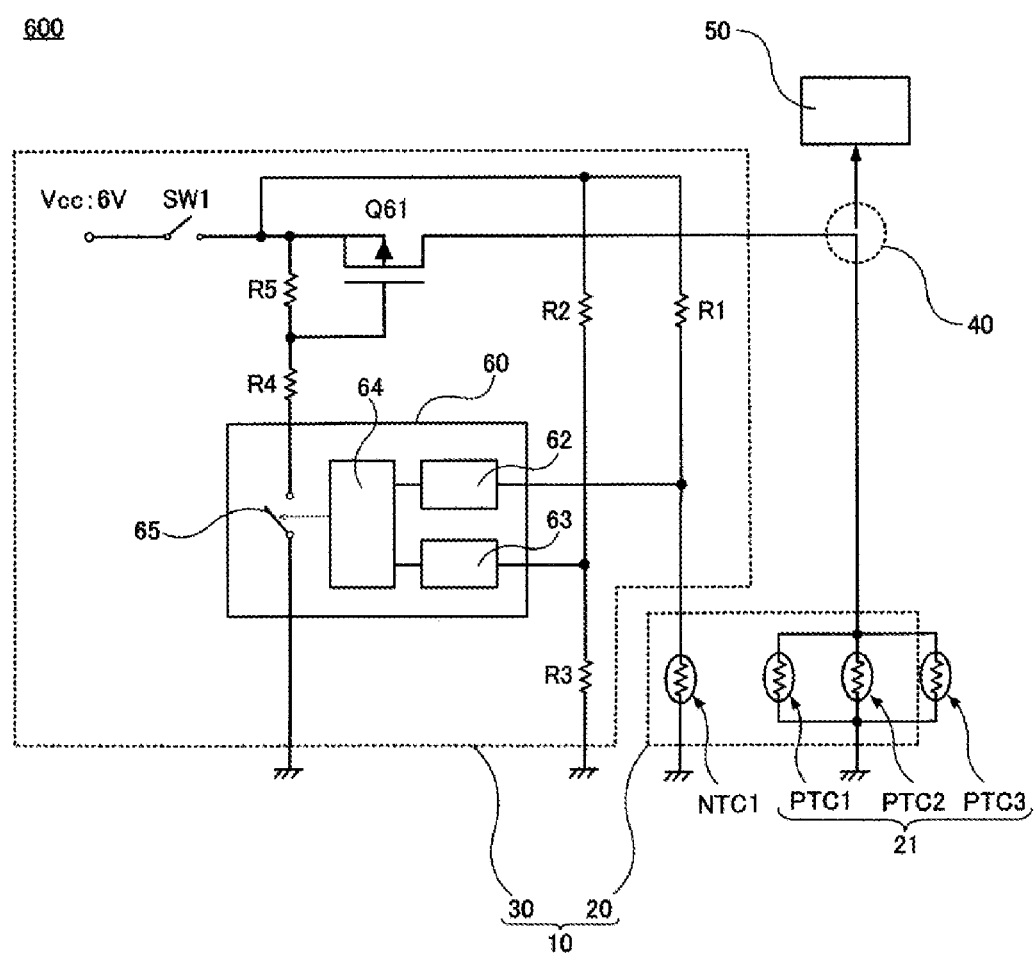
FIG. 10 is an equivalent circuit illustrating a wind speed measuring device 600 according to a sixth preferred embodiment of the present invention.

FIG. 10 shows a wind speed measuring device 600 according to a sixth preferred embodiment. Here, FIG. 10 shows an equivalent circuit of the wind speed measuring device 600.

The wind speed measuring device 600 is preferably defined by applying a plurality of modifications to the wind speed measuring device 100 according to the first preferred embodiment.

Specifically, in the wind speed measuring device 100, the PNP transistor is adopted in the switching element Q1. Instead of this, in the wind speed measuring device 600, a P-channel field effect transistor (FET) is preferably provided in a switching element Q61. More specifically, a source of the switching element (FET) Q61 is connected to the switch SW1, a drain of the switching element Q61 is connected to the heat generating element 21 of the wind speed sensor 20, and a gate of the switching element Q61 is connected to the connection point between the resistance element R4 and the resistance element R5. The switching element (FET) Q61 is provided to switch on and off of the supply of the electricity from the power source Vcc to the heat generating element 21.

Further, in the wind speed measuring device 100, the comparator element Cmp1 is preferably provided as a voltage comparing portion. Instead of this, in the wind speed measuring device 600, a second microcomputer 60 is preferably provided as a voltage comparing portion. The second microcomputer 60 includes a first A/D converter 62, a second A/D converter 63, a calculation portion 64, and a switch function 65. Here, the function of the second microcomputer 60 may be installed in the microcomputer 50 instead of newly arranging the second microcomputer 60.

In the second microcomputer 60, a connection point between the resistance element R1 and the first negative characteristic thermistor element NTC1 of the temperature detection voltage dividing circuit is connected to the first A/D converter 62, and a connection point between the resistance element R2 and the resistance element R3 of the comparison voltage dividing circuit is connected to the second A/D converter 63. Further, the first A/D converter 62 and the second A/D converter 63 are preferably connected to the calculation portion 64. Further, the calculation portion 64 is connected to the switch function 65. The switch function 65 is disposed between the resistance element R4 and the ground.

The second microcomputer 60 detects the temperature detection voltage at the connection point between the resistance element R1 and the first negative characteristic thermistor element NTC1 of the temperature detection voltage dividing circuit by using the first A/D converter 62 and detects the comparison voltage at the connection point between the resistance element R2 and the resistance element R3 of the comparison voltage dividing circuit by using the second A/D converter 63. Further, the temperature detection voltage and the comparison voltage are compared by using the calculation portion 64.

The second microcomputer 60 preferably turns on the switch function 65 by using the calculation portion 64 when the temperature of the first negative characteristic thermistor element NTC1 is less than the set temperature of about 40° C., the resistance value of the first negative characteristic thermistor element NTC1 is larger than the threshold resistance value of about 5.6 kΩ, and the temperature detection voltage is larger than the comparison voltage, so as to turn on the switching element (FET) Q61. As a result, the electricity is supplied to the heat generating element 21 from the power source Vcc through the switching element Q61.

On the other hand, the second microcomputer 60 preferably turns off the switch function 65 by using the calculation portion 64 when the temperature of the first negative characteristic thermistor element NTC1 is more than the set temperature of about 40° C., the resistance value of the first negative characteristic thermistor element NTC1 is larger than the threshold resistance value of about 5.6 kΩ, and the temperature detection voltage is smaller than the comparison voltage, to turn off the switching element Q61. As a result, the supply of the electricity to the heat generating element 21 is stopped, and therefore the heat generation of the heat generating element 21 is stopped.

As described above, the field effect transistor (FET) is able to be provided in the switching element Q61. Further, the second microcomputer 60 is able to be provided in a voltage comparing portion instead of the comparator element. Further, an N-channel field effect transistor may be provided instead of the P-channel field effect transistor.

Seventh Preferred Embodiment

Figure 11:
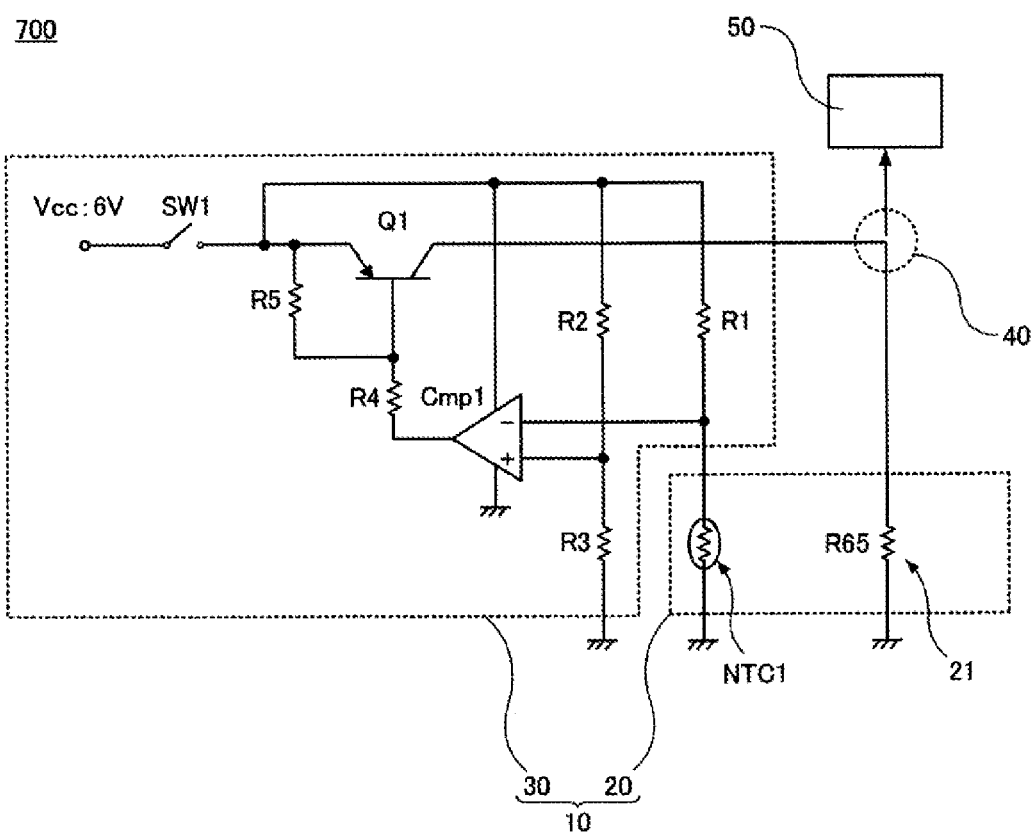
FIG. 11 is an equivalent circuit illustrating a wind speed measuring device 700 according to a seventh preferred embodiment of the present invention.

FIG. 11 shows a wind speed measuring device 700 according to a seventh preferred embodiment. Here, FIG. 11 shows an equivalent circuit of the wind speed measuring device 700.

The wind speed measuring device 700 is preferably also defined by modifying the wind speed measuring device 100 according to the first preferred embodiment.

Specifically, in the wind speed measuring device 100, three positive characteristic thermistor elements PTC1 to PTC3 are preferably connected in parallel as the heat generating element 21. Instead of this, in the wind speed measuring device 700, one resistance element R65 is provided as the heat generating element 21.

In this way, any kind of elements is able to be provided in the heat generating element 21 of the wind speed sensor 20, and therefore it is not limited to the positive characteristic thermistor element. Accordingly, the resistance element R65, such as a chip resistance or a nichrome wire, for example, may be provided.

Eighth Preferred Embodiment

Figure 12:
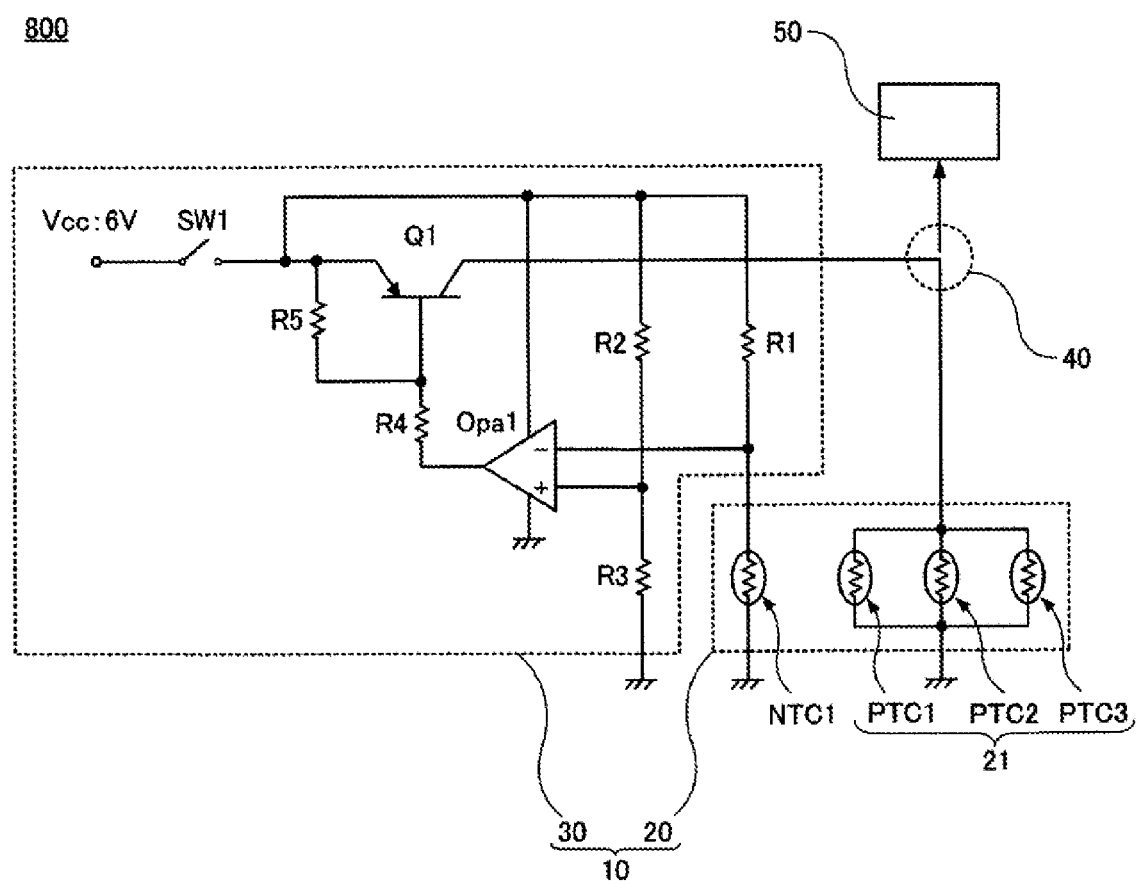
FIG. 12 is an equivalent circuit illustrating a wind speed measuring device 800 according to an eighth preferred embodiment of the present invention.
Figure 13:
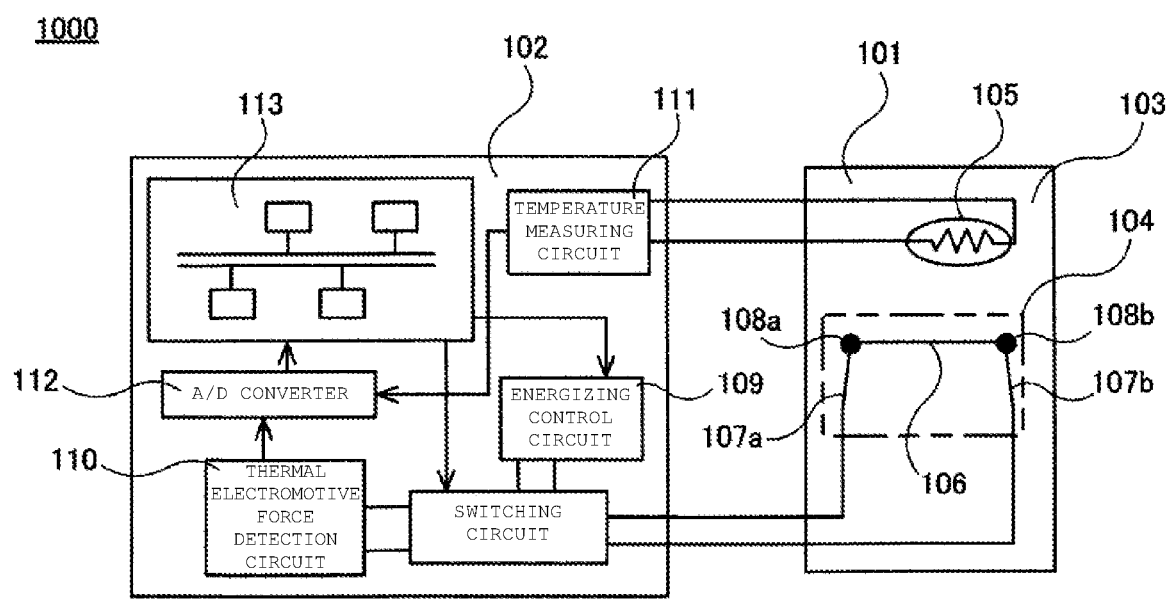
FIG. 13 is a view describing a gas flow meter 1000 disclosed in Japanese Patent Application Laid-Open No. 2008-241318.

FIG. 12 shows a wind speed measuring device 800 according to an eighth preferred embodiment. Here, FIG. 12 shows an equivalent circuit of the wind speed measuring device 800.

The wind speed measuring device 800 is preferably also defined by modifying the wind speed measuring device 100 according to the first preferred embodiment.

Specifically, in the wind speed measuring device 100, the comparator element Cmp1 is preferably provided as a voltage comparing portion. Instead of this, in the wind speed measuring device 800, an operation amplifier element Opal is preferably provided as a voltage comparing portion.

In this way, also in a case in which the operation amplifier element Opal is provided as a voltage comparing portion, the operation amplifier element Opal functions similar to the comparator element Cmp1.

As described above, the wind speed measuring devices 100, 200, 300, 400, 500, 600, 700 and 800 according to the first to the eighth preferred embodiments are described. However, the present invention is not limited to the description described above, and therefore the preferred embodiments are able to be modified in accordance with the subject matter of the present invention.

For example, in the wind speed measuring devices 100, 200, 300, 400, 600 and 800, three positive characteristic thermistor elements PTC1 to PTC3 are connected in parallel as the heat generating element 21, and in the wind speed measuring device 500, one positive characteristic thermistor element PTC51 is adopted as the heat generating element 21. However, the heat generating element 21 is not limited to the positive characteristic thermistor element, and therefore a heater element or other kind of element may be adopted. Further, in a case in which the positive characteristic thermistor element is adopted, any number thereof is able to be adopted. That is, the number thereof is able to be selected in accordance with the resistance, a required heat value or the like of the adopted positive characteristic thermistor element.

Further, in the wind speed measuring devices 100, 200, 300, 400, 500, 600, 700 and 800, the electricity is supplied to all of the temperature detection voltage dividing circuit, the comparison voltage dividing circuit, and the heat generating element 21 (the positive characteristic thermistor elements PTC1 to PTC3, PTC64 and R65) from one power source Vcc (direct current with 6 V), however the electricity may be supplied from respective power sources. Further, the voltage applied to the temperature detection voltage dividing circuit, the comparison voltage dividing circuit, and the heat generating element is not limited to 6 V. Further, respective voltages different from each other may be applied to the temperature detection voltage dividing circuit, the comparison voltage dividing circuit, and the heat generating element.

Further, in each of the wind speed measuring devices according to the preferred embodiments, the set temperature of the constant temperature heat generating device 10 may be set to any temperature, and therefore the set temperature is not limited to the temperature described in the preferred embodiments. The set temperature may be appropriately set in accordance with a use environment (an environment at the wind speed measurement point).

Further, in each of the wind speed measuring devices according to the preferred embodiments, the resistance temperature characteristic of each of the first negative characteristic thermistor elements NTC1, NTC31, NTC41 and NTC51, and the second negative characteristic thermistor elements NTC32, NTC42 and NTC52 may be set to any resistance temperature characteristic, and therefore they are not limited to those described in the preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wind speed measuring device comprising a constant temperature heat generating device that generates heat at a predetermined set temperature or around the predetermined set temperature;
wherein
the constant temperature heat generating device comprises an electricity input portion, a heat generating element, a switching element, a voltage comparing portion, a first negative characteristic thermistor element, and a plurality of resistance elements;
the heat generating element and the first negative characteristic thermistor element define a wind speed sensor;
the heat generating element is configured to generate heat with electricity supplied from the electricity input portion;
the switching element is between the electricity input portion and the heat generating element;

the voltage comparing portion is configured to control turning on and off of the switching element;
the first negative characteristic thermistor element is thermally coupled to the heat generating element to be close to the heat generating element in temperature, the first negative characteristic thermistor element having a resistance value at the predetermined set temperature as a threshold resistance value;
the first negative characteristic thermistor element and at least one resistance element are connected in series to define a temperature detection voltage dividing circuit;
a temperature detection voltage is output from a connection point between first negative characteristic thermistor element and the resistance element of the temperature detection voltage dividing circuit;
at least two resistance elements are connected in series to define a comparison voltage dividing circuit;
a comparison voltage is output from a connection point between one resistance element and another resistance element of the comparison voltage dividing circuit;
each of: (a) resistance values of the resistance element of the temperature detection dividing circuit and the resistance elements of the comparison voltage dividing element, and (b) the voltages applied to the temperature detection voltage dividing circuit and the comparison voltage dividing circuit are set such that the temperature detection voltage is equal to the comparison voltage when a temperature of the first negative characteristic thermistor element is equal to the predetermined set temperature and a resistance value of the first negative characteristic thermistor element is equal to the threshold resistance value;
the voltage comparing portion is configured to compare the temperature detection voltage and the comparison voltage, and when the temperature of the first negative characteristic thermistor element is less than the predetermined set temperature and the resistance value of the first negative characteristic thermistor element is larger than the threshold resistance value, the voltage comparing portion turns on the switching element, and when the temperature of the first negative characteristic thermistor element is more than the predetermined set temperature and the resistance value of the first negative characteristic thermistor element is smaller than the threshold resistance value, the voltage comparing portion turns off the switching element;
the switching element repeats the on and off to apply a pulse voltage from electricity input portion to the heat generating element; and
a wind speed of a wind contacted with the wind speed sensor is calculated based on a wave form of the applied pulse voltage.

2. The wind speed measuring device according to claim 1, wherein:
when the temperature of the first negative characteristic thermistor element is less than the predetermined set temperature and the resistance value of the first negative characteristic thermistor element is larger than the threshold resistance value, the temperature detection voltage is larger than the comparison voltage, and when the temperature of the first negative characteristic thermistor element is more than the predetermined set temperature and the resistance value of the first negative characteristic thermistor element is smaller than the threshold resistance value, the temperature detection voltage is smaller than the comparison voltage; or when the temperature of the first negative characteristic thermistor element is less than the predetermined set temperature and the resistance value of the first negative characteristic thermistor element is larger than the threshold resistance value, the temperature detection voltage is smaller than the comparison voltage, and when the temperature of the first negative characteristic thermistor element is more than the predetermined set temperature and the resistance value of the first negative characteristic thermistor element is smaller than the threshold resistance value, the temperature detection voltage is larger than the comparison voltage.

3. The wind speed measuring device according to claim 1, wherein the wind speed of the wind contacted with the wind speed sensor is calculated based on a duty ratio of the wave form of the pulse voltage.

4. The wind speed measuring device according to claim 1, wherein the wind speed of the wind contacted with the wind speed sensor is calculated based on a ratio of on-time per one time cycle in the wave form of the pulse voltage.

5. The wind speed measuring device according to claim 1, wherein the voltage comparing portion includes a comparator element.

6. The wind speed measuring device according to claim 1, wherein the voltage comparing portion includes an operation amplifier element.

7. The wind speed measuring device according to claim 1, wherein the voltage comparing portion includes a microcomputer.

8. The wind speed measuring device according to claim 1, wherein the switching element is a transistor.

9. The wind speed measuring device according to claim 8, wherein the transistor is a field effect transistor.

10. The wind speed measuring device according to claim 1, wherein the heat generating element is a positive characteristic thermistor element.

11. The wind speed measuring device according to claim 1, further comprising a second negative characteristic thermistor element that provides temperature compensation, wherein the second negative thermistor element corrects the predetermined set temperature.

12. The wind speed measuring device according to claim 11, wherein the predetermined set temperature is larger than a temperature of the second negative characteristic thermistor element and different from the temperature of the second negative characteristic thermistor element by a predetermined temperature difference, and the predetermined set temperature is changed while keeping the temperature difference in accordance with a temperature change of the second negative characteristic thermistor element.

13. The wind speed measuring device according to claim 11, wherein the second negative characteristic thermistor element is connected to one resistance element, which defines the comparison voltage dividing circuit, in parallel.

14. The wind speed measuring device according to claim 13, wherein a condenser is further connected to the second negative characteristic thermistor element in parallel.

15. The wind speed measuring device according to claim 13, wherein a resistance element is further connected to the first negative characteristic thermistor element in series in the temperature detection voltage dividing circuit.

16. The wind speed measuring device according to claim 11, wherein an electrical characteristic of the first negative characteristic thermistor element is same as an electrical characteristic of the second negative characteristic thermistor element.

17. The wind speed measuring device according to claim 1, wherein:
one resistance element of the comparison voltage dividing circuit is replaced by a second negative characteristic thermistor element that provides temperature compensation;
a resistance value of another resistance element of the comparison voltage dividing circuit and a resistance value of the resistance element of the temperature detection voltage dividing circuit are adjusted; and
the predetermined set temperature is corrected by the second negative characteristic thermistor element.

18. The wind speed measuring device according to claim 17, wherein the predetermined set temperature is larger than a temperature of the second negative characteristic thermistor element and different from the temperature of the second negative characteristic thermistor element by a predetermined temperature difference, and the predetermined set temperature is changed while keeping the temperature difference in accordance with a temperature change of the second negative characteristic thermistor element.

19. The wind speed measuring device according to claim 1, wherein:
a second negative characteristic thermistor element that provides temperature compensation is connected to one resistance element of the comparison voltage dividing circuit in series;
the predetermined set temperature is corrected by the second negative characteristic thermistor element;
the predetermined set temperature is more than a temperature of the second negative characteristic thermistor;
the predetermined set temperature is changed in accordance with a temperature change of the second negative characteristic thermistor element;
a temperature difference between the predetermined set temperature and the temperature of the second negative characteristic thermistor element becomes smaller as the temperature of the second negative characteristic thermistor element is increased; and
the temperature difference between the predetermined set temperature and the temperature of the second negative characteristic thermistor element becomes larger as the temperature of the second negative characteristic thermistor element is decreased.

20. An airflow measuring device using a wind speed measuring device, wherein the wind speed measuring device comprising a constant temperature heat generating device that generates heat at a predetermined set temperature or around the predetermined set temperature; wherein the constant temperature heat generating device comprises an electricity input portion, a heat generating element, a switching element, a voltage comparing portion, a first negative characteristic thermistor element, and a plurality of resistance elements; the heat generating element and the first negative characteristic thermistor element define a wind speed sensor; the heat generating element is configured to generate heat with electricity supplied from the electricity input portion; the switching element is between the electricity input portion and the heat generating element; the voltage comparing portion is configured to control turning on and off of the switching element; the first negative characteristic thermistor element is thermally coupled to the heat generating element to be close to the heat generating element in temperature, the first negative characteristic thermistor element having a resistance value at the predetermined set temperature as a threshold resistance value; the first negative characteristic thermistor element and at least one resistance element are connected in series to define a temperature detection voltage dividing circuit; a temperature detection voltage is output from a connection point between first negative characteristic thermistor element and the resistance element of the temperature detection voltage dividing circuit; at least two resistance elements are connected in series to define a comparison voltage dividing circuit; a comparison voltage is output from a connection point between one resistance element and another resistance element of the comparison voltage dividing circuit; each of: (a) resistance values of the resistance element of the temperature detection dividing circuit and the resistance elements of the comparison voltage dividing element, and (b) the voltages applied to the temperature detection voltage dividing circuit and the comparison voltage dividing circuit are set such that the temperature detection voltage is equal to the comparison voltage when a temperature of the first negative characteristic thermistor element is equal to the predetermined set temperature and a resistance value of the first negative characteristic thermistor element is equal to the threshold resistance value; the voltage comparing portion is configured to compare the temperature detection voltage and the comparison voltage, and when the temperature of the first negative characteristic thermistor element is less than the predetermined set temperature and the resistance value of the first negative characteristic thermistor element is larger than the threshold resistance value, the voltage comparing portion turns on the switching element, and when the temperature of the first negative characteristic thermistor element is more than the predetermined set temperature and the resistance value of the first negative characteristic thermistor element is smaller than the threshold resistance value, the voltage comparing portion turns off the switching element; the switching element repeats the on and off to apply a pulse voltage from electricity input portion to the heat generating element; and a wind speed of a wind contacted with the wind speed sensor is calculated based on a wave form of the applied pulse voltage.

\* \* \* \* \*